Figure 1:
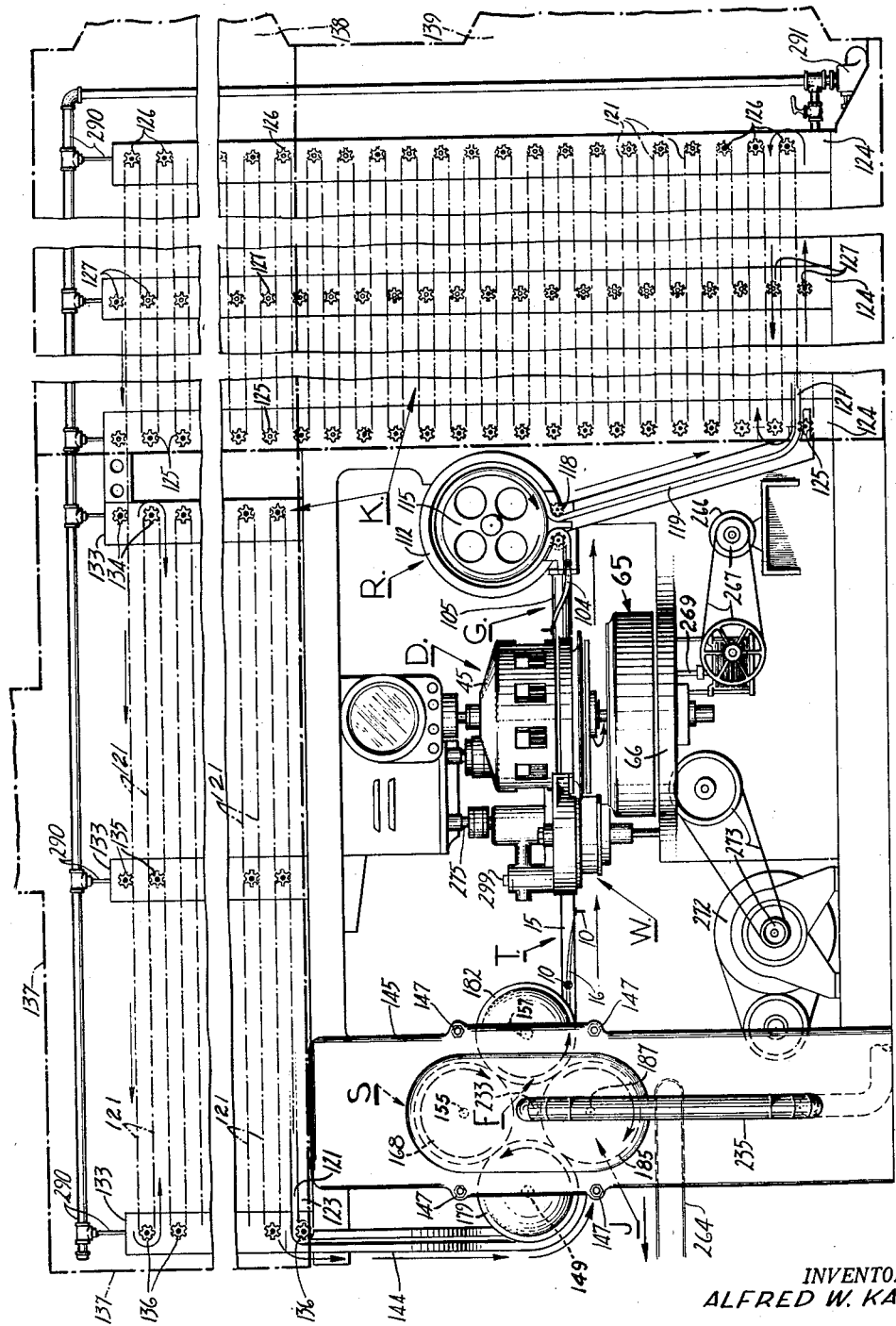

March 9, 1954    A. W. KATH    2,671,245
CAPSULE MACHINE
Filed Feb. 3, 1949    14 Sheets-Sheet 1

INVENTOR.
ALFRED W. KATH
BY

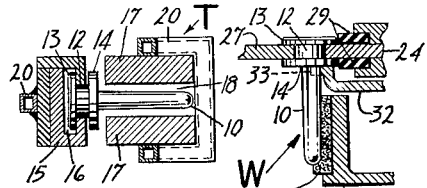
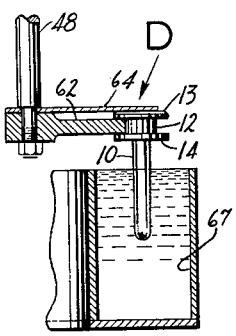
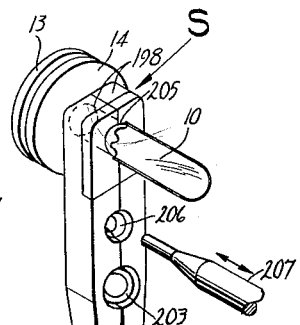
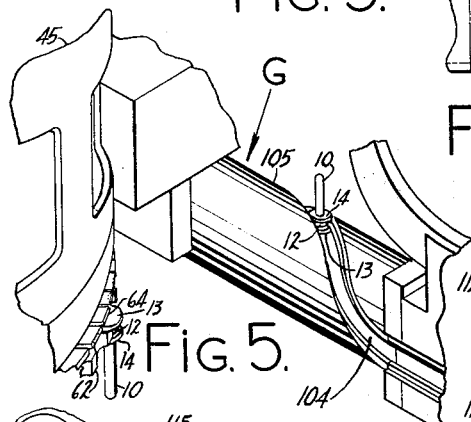
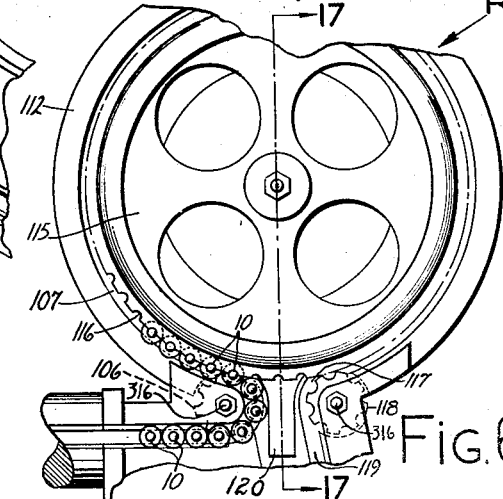
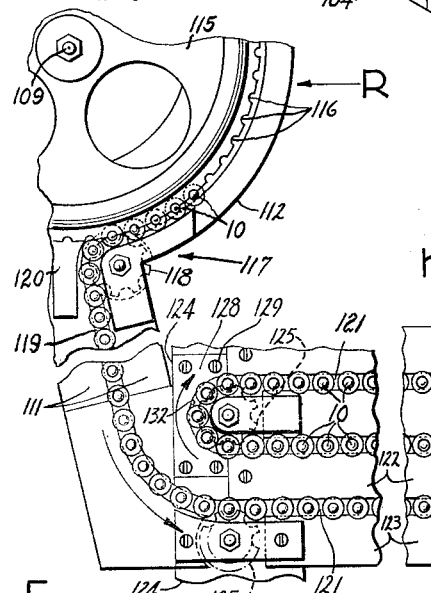
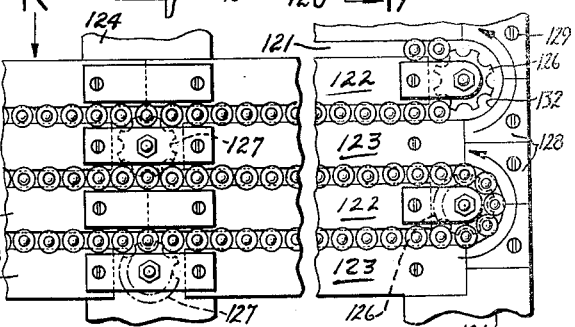
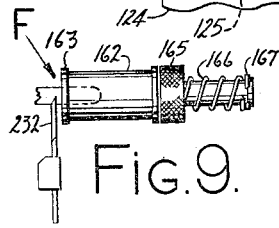
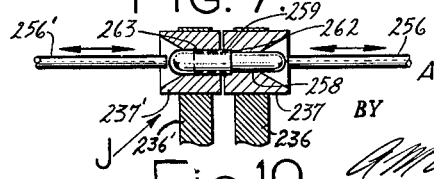

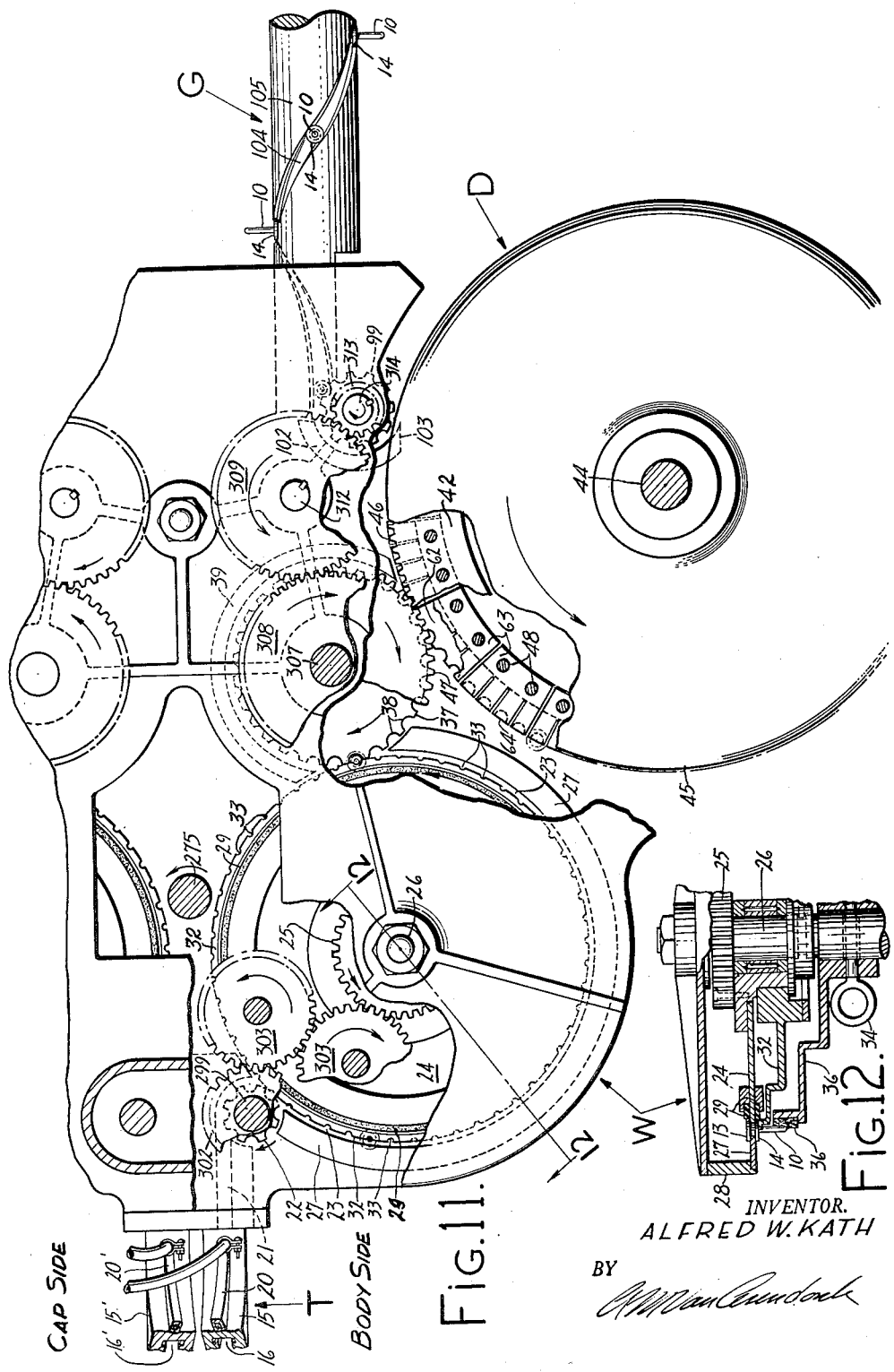

March 9, 1954  A. W. KATH  2,671,245
CAPSULE MACHINE
Filed Feb. 3, 1949  14 Sheets-Sheet 4

INVENTOR.
ALFRED W. KATH
BY

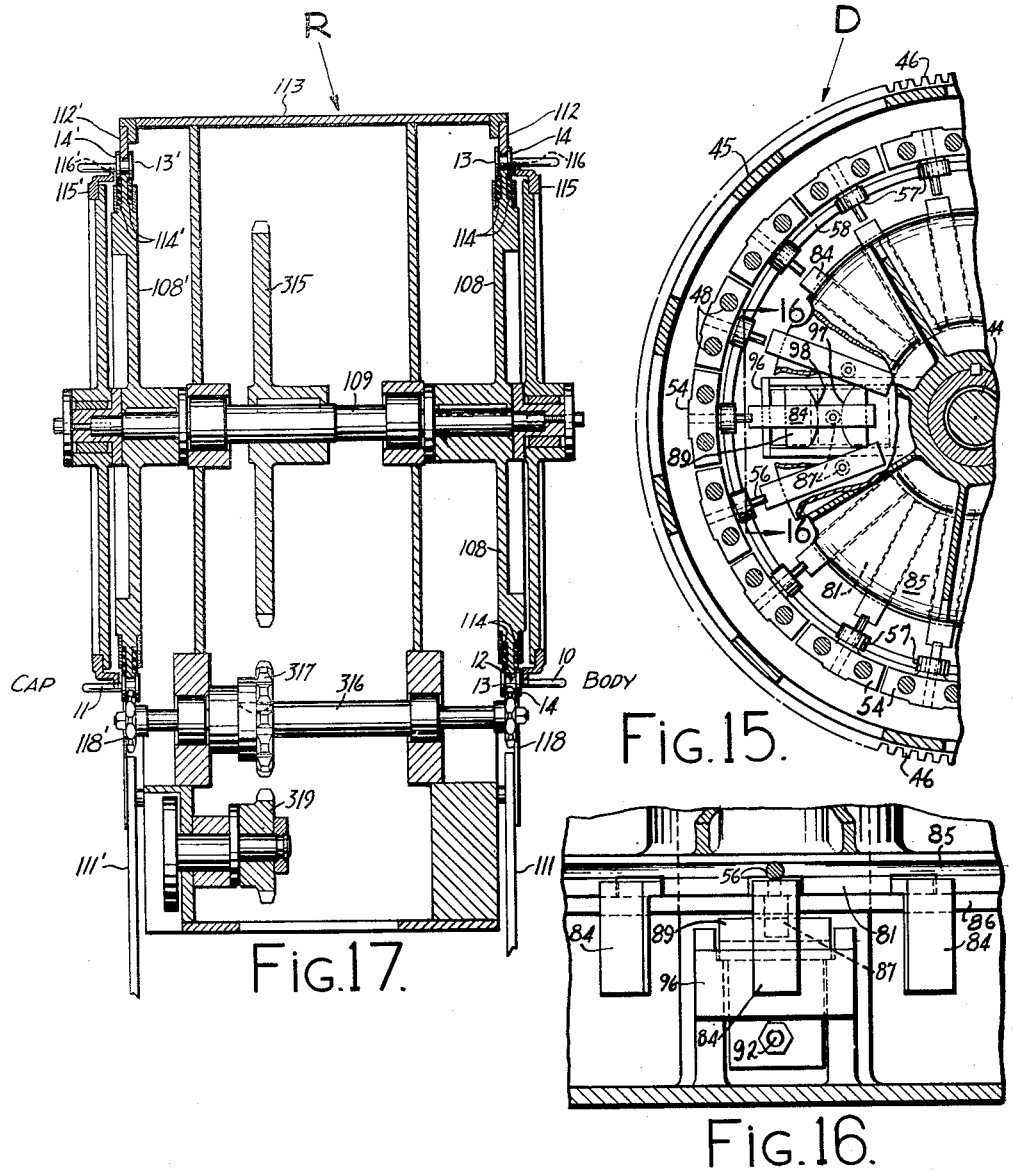

March 9, 1954  A. W. KATH  2,671,245
CAPSULE MACHINE
Filed Feb. 3, 1949  14 Sheets-Sheet 6
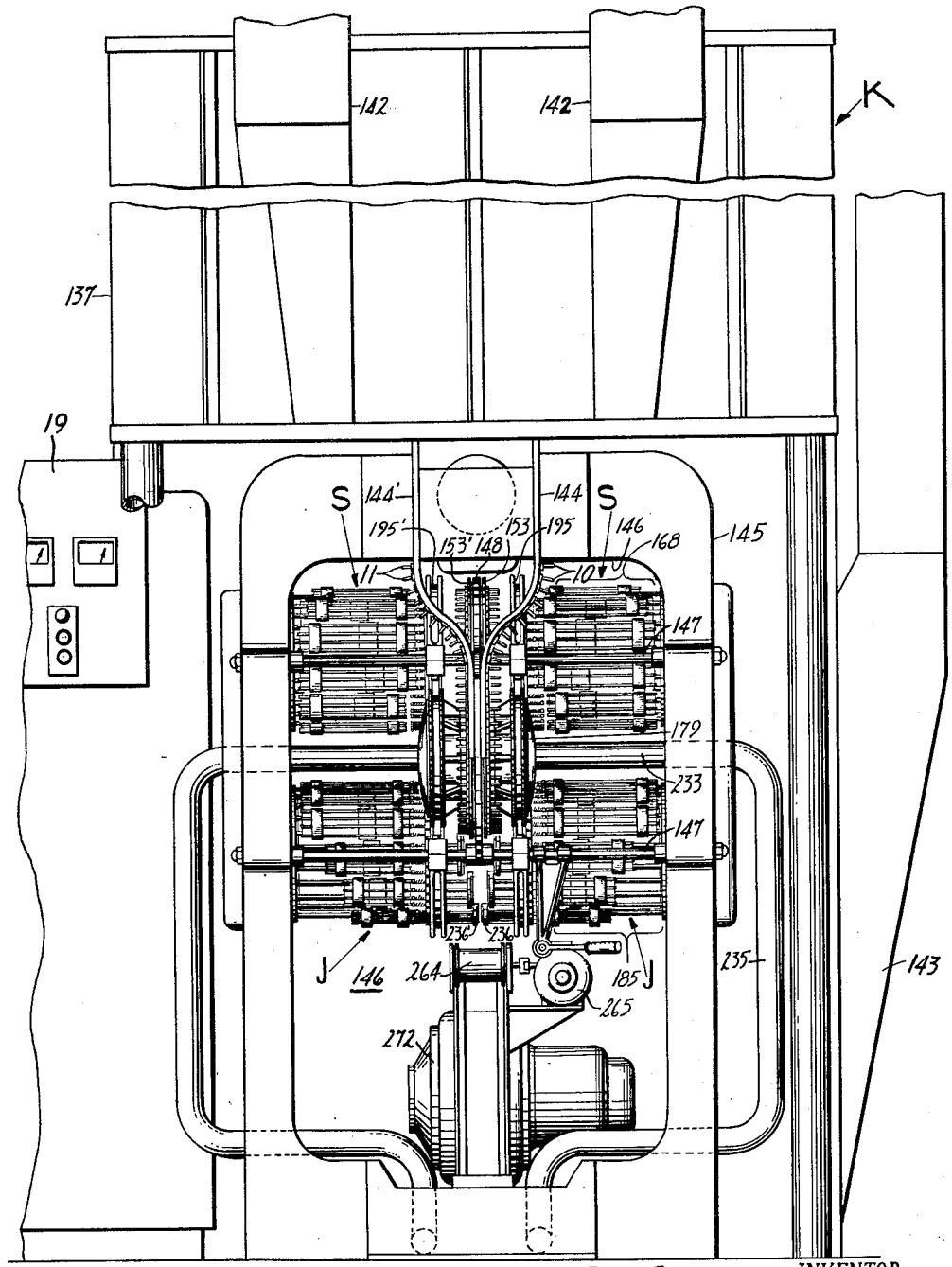
CAP SIDE  Fig.18.  BODY SIDE  INVENTOR.
ALFRED W. KATH
BY

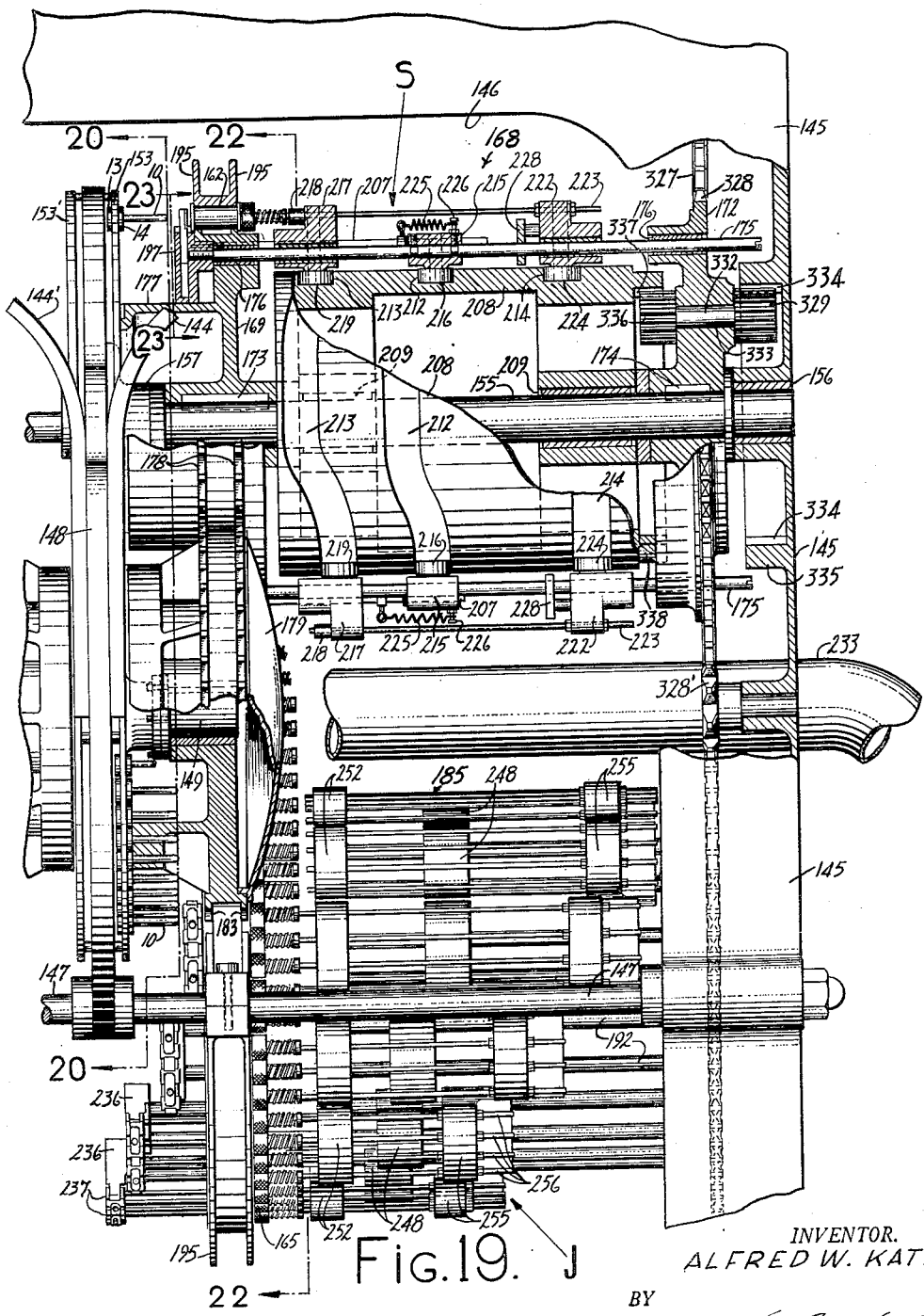

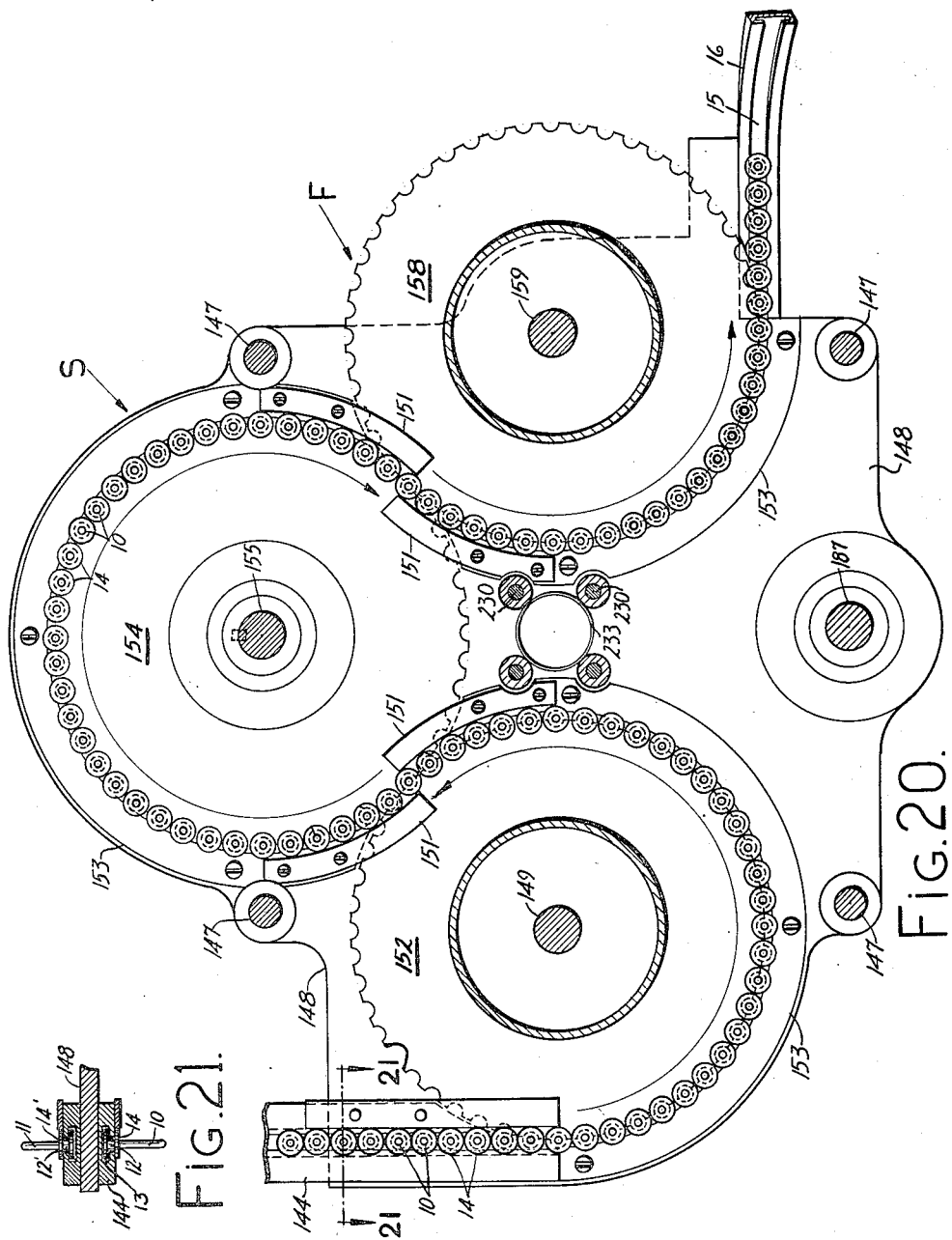

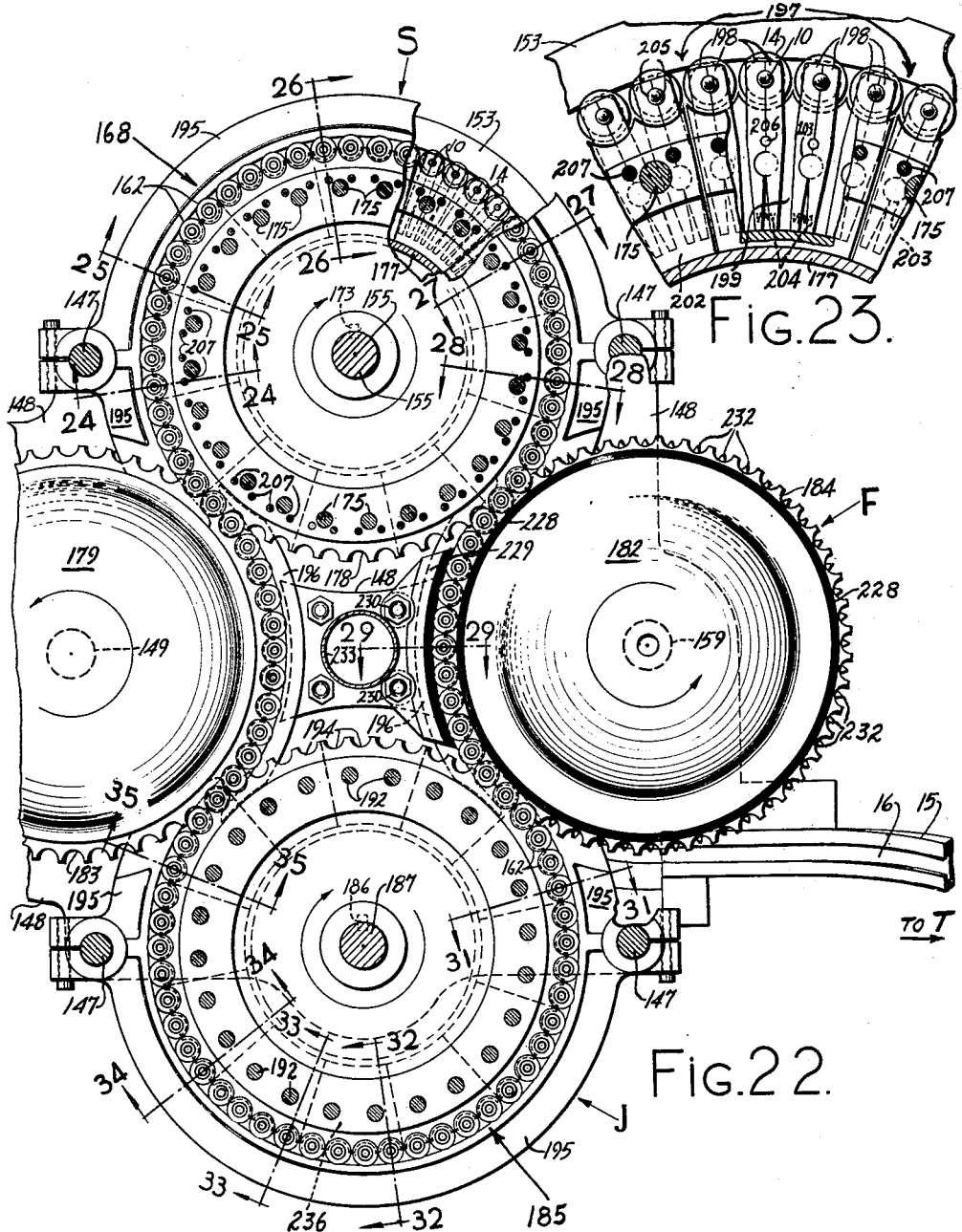

March 9, 1954 A. W. KATH 2,671,245
CAPSULE MACHINE
Filed Feb. 3, 1949 14 Sheets-Sheet 10
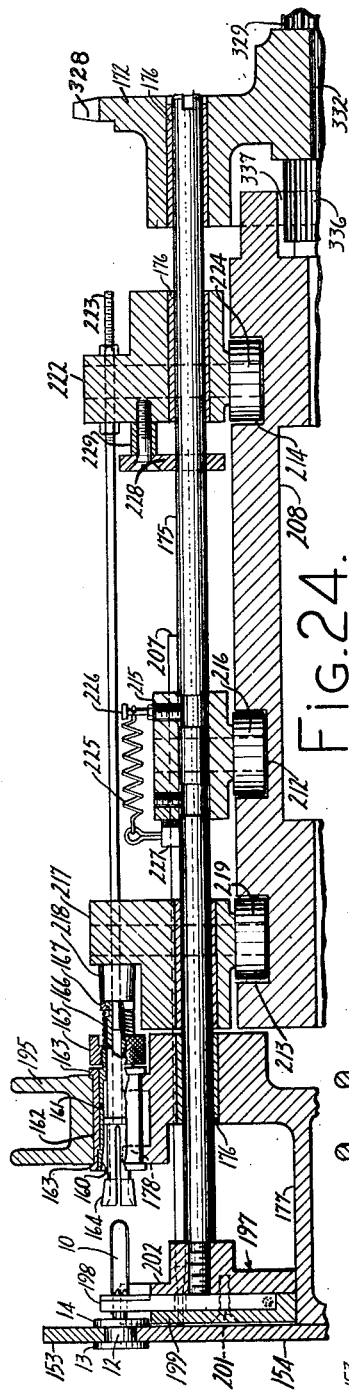
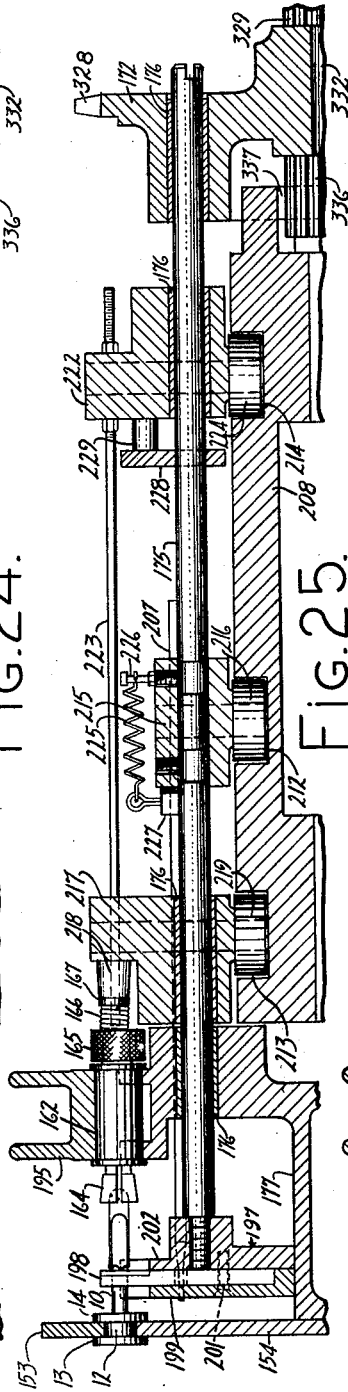
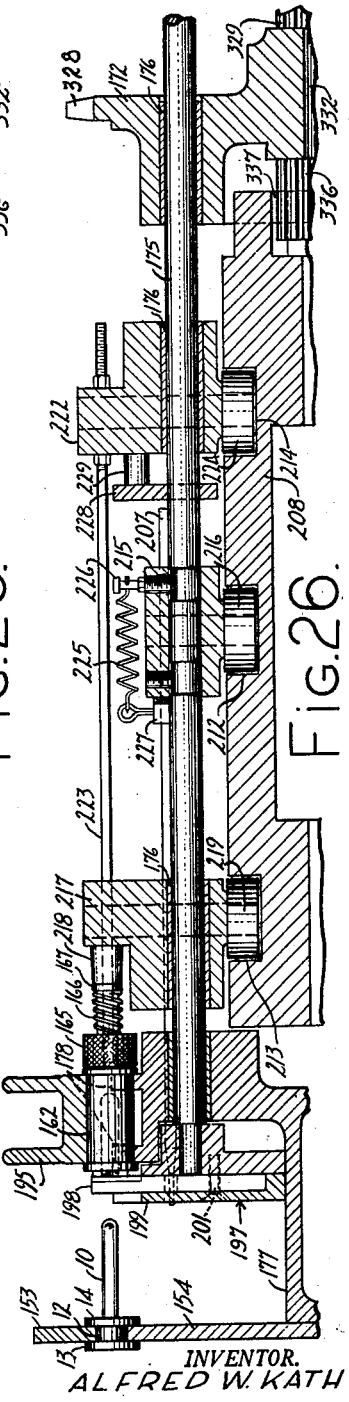
INVENTOR.
ALFRED W. KATH
BY

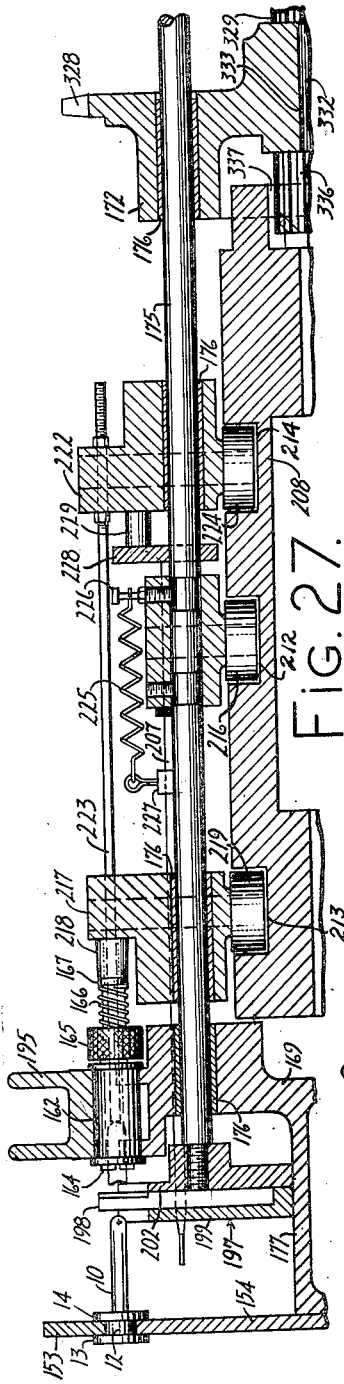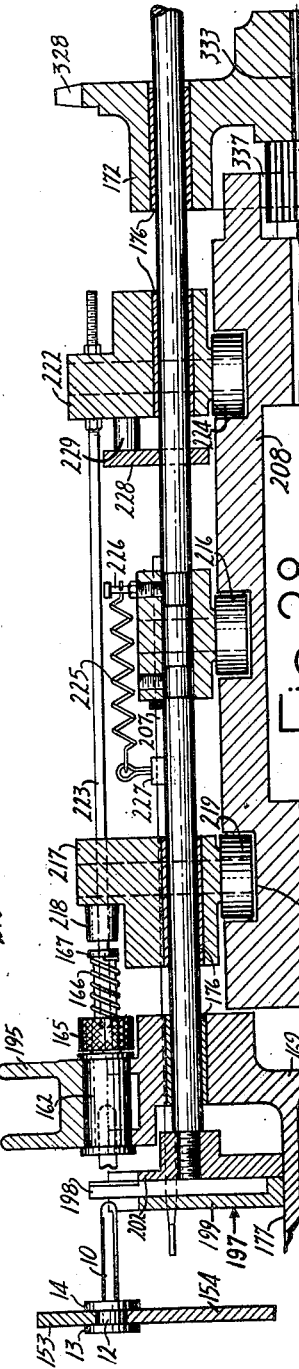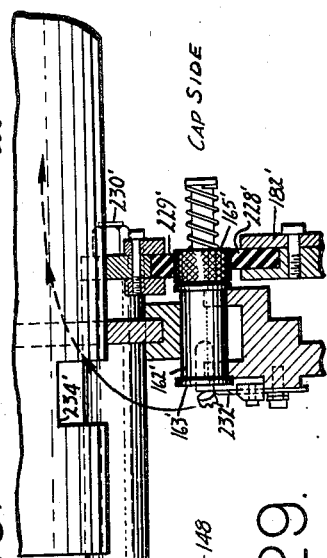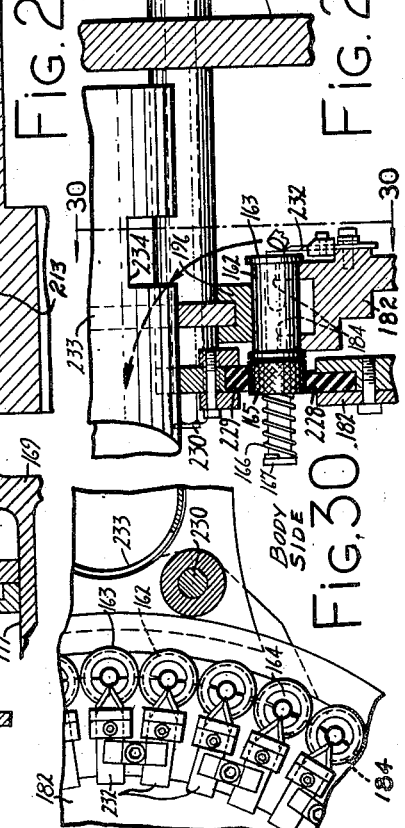

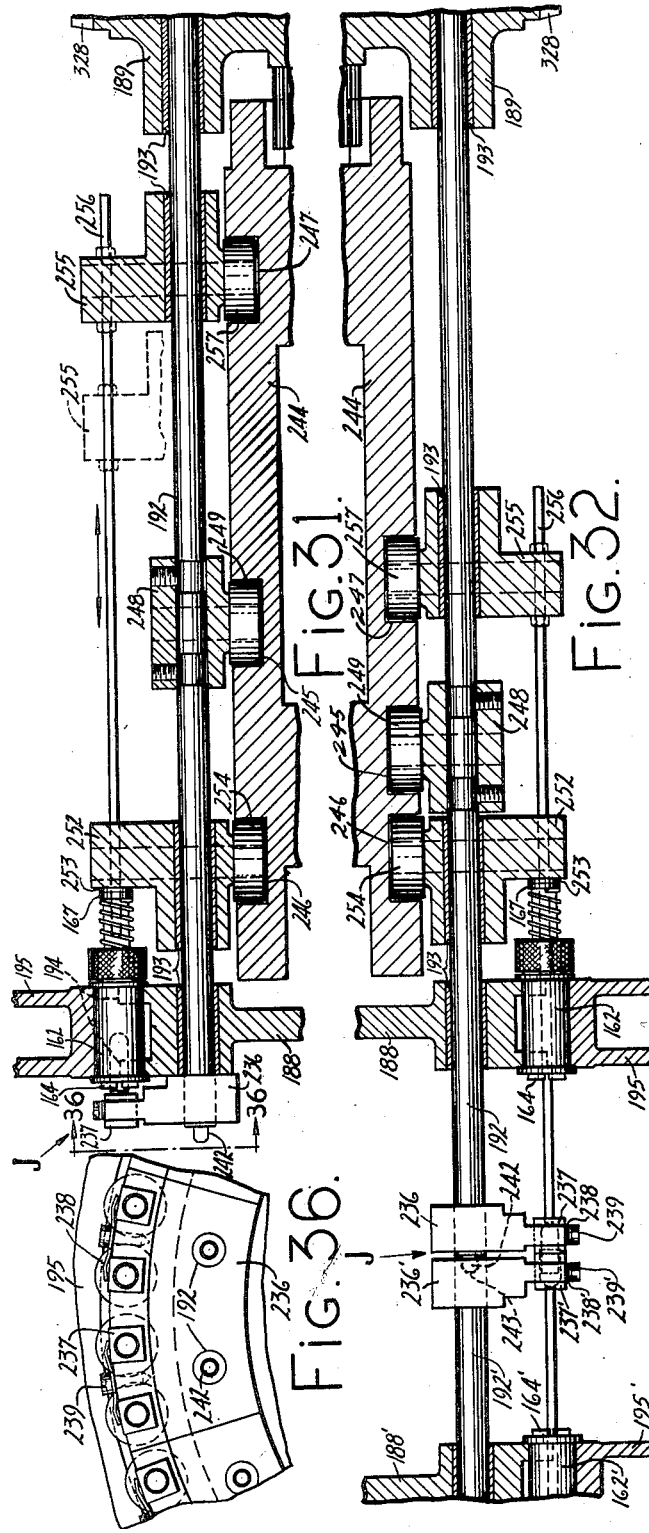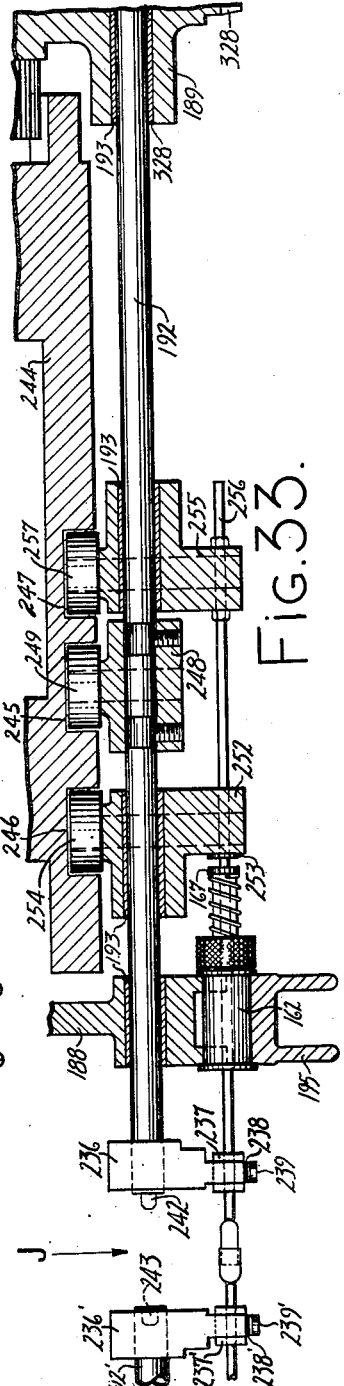

March 9, 1954 A. W. KATH 2,671,245
CAPSULE MACHINE
Filed Feb. 3, 1949 14 Sheets-Sheet 13
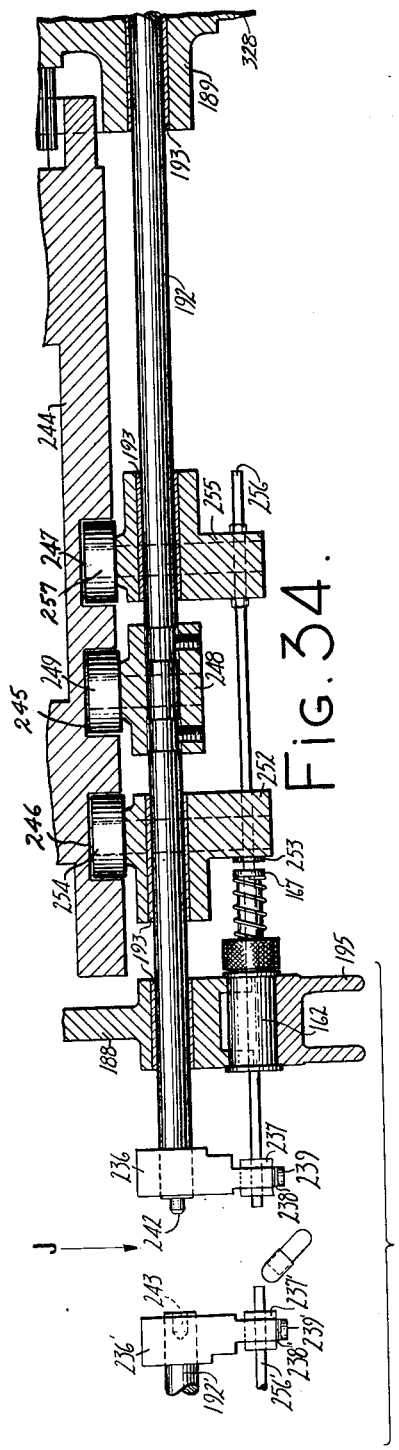
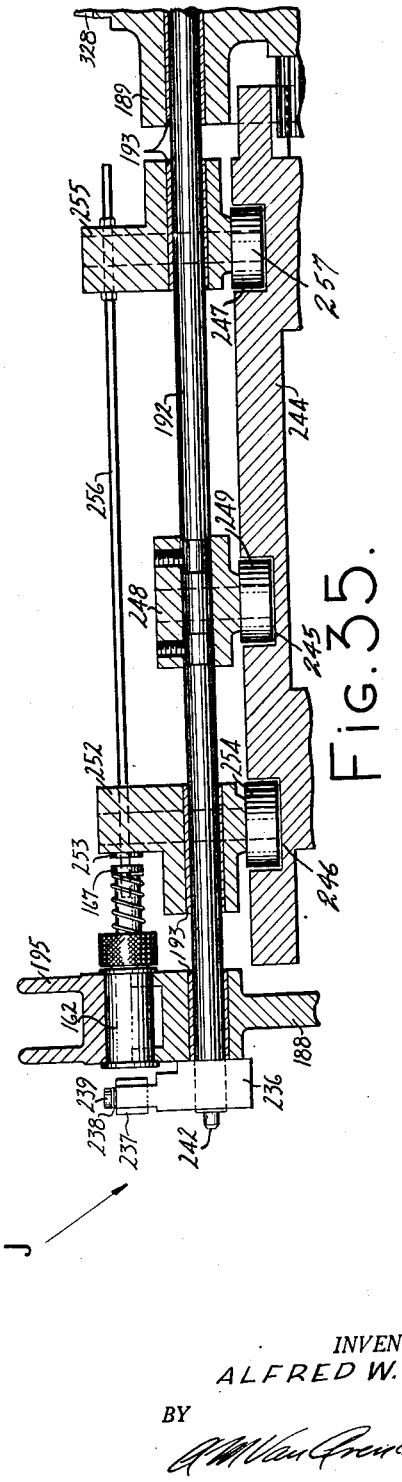
INVENTOR.
ALFRED W. KATH
BY Patented Mar. 9, 1954

2,671,245

UNITED STATES PATENT OFFICE 2,671,245

CAPSULE MACHINE

Alfred W. Kath, Detroit, Mich., assignor to Eli Lilly and Company, Indianapolis, Ind., a corporation of Indiana Application February 3, 1949, Serial No. 74,414

31 Claims. (Cl. 18—25)

This invention relates to machines for making capsules and more particularly to automatic machines of this character.

It is an object of the invention to provide a capsule making machine which is smoothly and automatically operable to form, strip, finish and join capsule caps and bodies continuously, progressively, and without any interruption to the advance of the capsule parts and the elements upon which they are formed, to, through and from various operation performing stations of the machine from the moment of initiating the formation of the capsule cap and body parts to the moment of their being joined together and ejected.

It is a further object to provide a capsule making machine which effectively and efficiently increases the rate of finished capsule output over that hitherto obtainable with machines of this class and which is productive of capsules having a marked degree of uniformity both in cross-sectional wall thickness and particularly the over-all joined length.

Another object is to provide a machine of this character that is completely free of intermittent movements; this feature not only contributes to the increased rate of output of formed capsules, but also effects marked savings in maintenance, upkeep and servicing costs.

A salient feature of the invention is the provision of independent, discrete, capsule-part forming pins which are easily and quickly replaceable without necessitating removal of or other disturbance to adjoining pins and which are arranged in the machine in such manner that they are adapted to push one another along guide tracks and thus contribute toward effecting their progressive advance through the machine from one operation performing station to the next.

A still further object is to provide a machine of this character which is readily adapted to form the capsule parts from a gelatin solution, a methylcellulose solution or from such other solutions as it may be desired to use in the manufacture of different types of capsules.

With these and incidental objects in view, the invention consists in certain novel features of construction and combinations of parts, the essential elements of which are set forth in appended claims, and a preferred embodiment of which is hereinafter described with reference to the drawings which accompany and form part of this specification.

Figure 13:
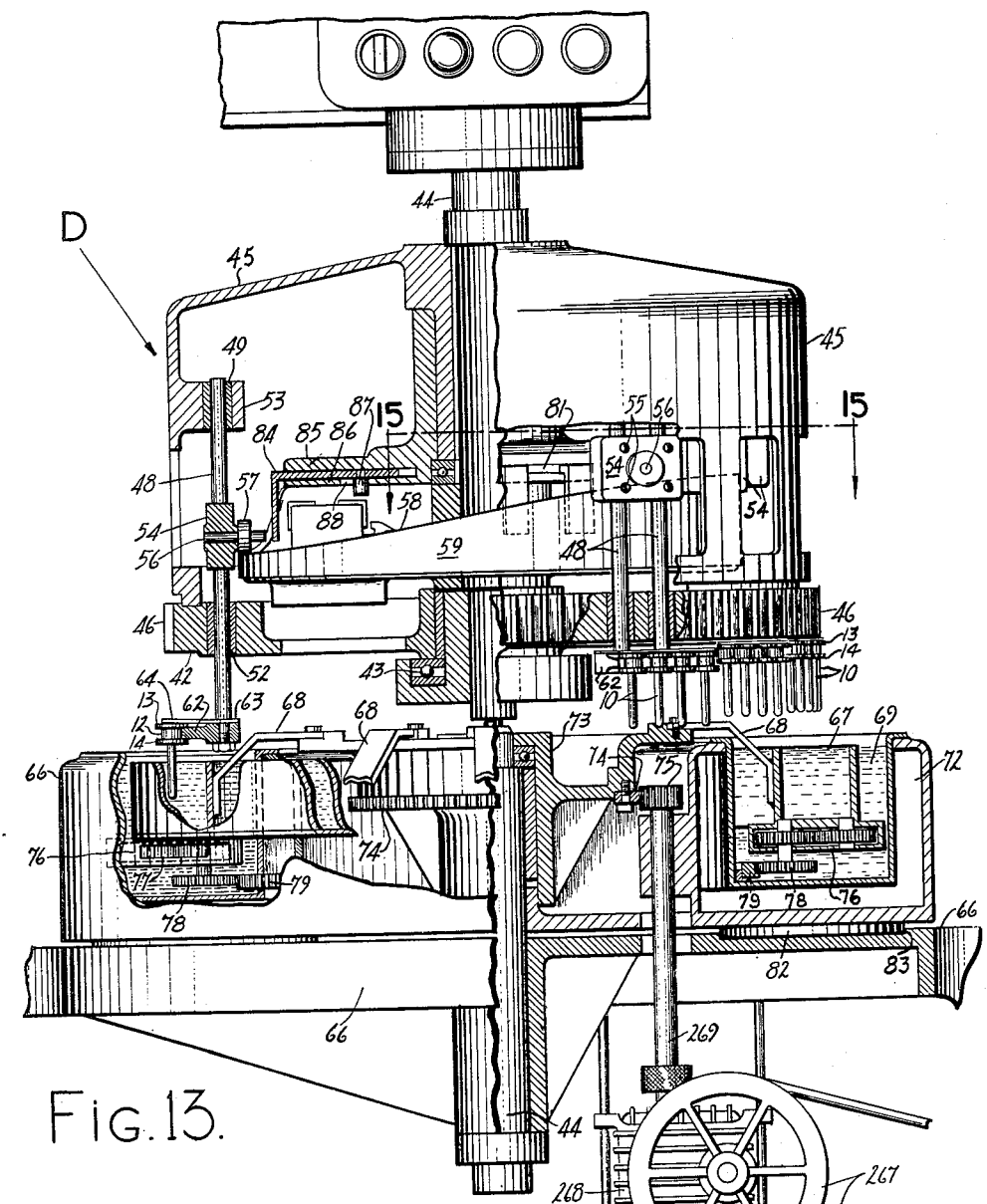
Figure 14:
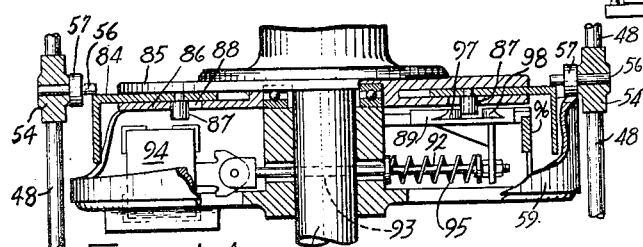
Figure 37:
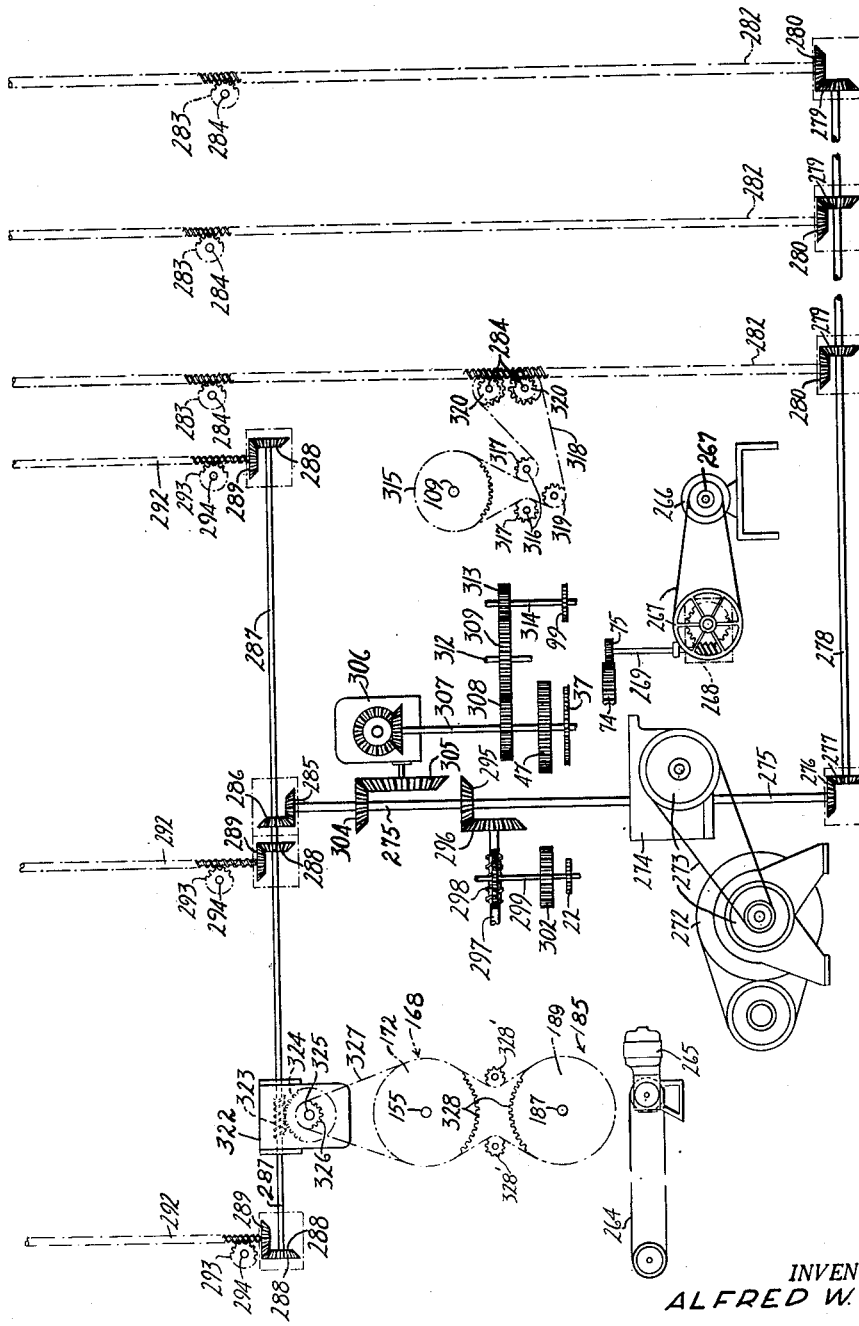

In the drawings:

Fig. 1 is a partly schematic side elevation of the complete capsule body-part forming side of the machine, Figs. 2 to 10, inclusive, are fragmentary views illustrating the several operations of the machine, Fig. 11 is a top plan view with certain parts broken away and showing portions of the pin wiping and dipping units together with portions of the drive mechanisms therefor, Fig. 12 is a sectional view of the wiping unit taken along the line 12—12 of Fig. 11, Fig. 13 is an elevation, partly in section, of the dipping unit, Fig. 14 is a detailed sectional view of a solenoid operated latch means employed in the dipping unit, Fig. 15 is a sectional plan view taken along the line 15—15 of Fig. 13 and showing the latch means, Fig. 16 is a sectional elevation taken along the line 16—16 of Fig. 15, Fig. 17 is a sectional elevation taken substantially along the line 17—17 of Fig. 6 showing certain details of the spinner unit, Fig. 18 is a front end elevation of the machine, Fig. 19 is a partially sectioned enlarged view of a portion of Fig. 18 showing certain rotating drum mechanisms with associated automatic capsule part stripping, positioning, and joining mechanisms, Fig. 20 is a sectional elevation taken along the line 20—20 of Fig. 19 and shows certain pin carrying disks, Fig. 21 is a sectional detail taken along the line 21—21 of Fig. 20, Fig. 21 is a sectional elevation taken along the line 22—22 of Fig. 19 and shows the path of certain capsule-part holders and portions of the capsule-part trimming mechanism, Fig. 23 is a detail end elevation taken along the line 23—23 of Fig. 19 and shows a portion of stripping jaw units, Figs. 24 to 29 are sectional detail views taken, respectively, along the lines 24—24 to 29—29 of Fig. 22, showing progressive positions of certain parts during the stripping, positioning, and trimming operations, Fig. 30 is a detail side view taken along the line 30—30 of Fig. 29 and shows a portion of the trimming mechanism, Figs. 31 to 35 are sectional detail views taken, respectively, along the lines 31—31 to 35—35 of Fig. 22 showing progressive positions of certain parts during the joining and ejecting operations, Fig. 36 is a detail end elevation taken along the line 36—36 of Fig. 31 showing a joining block sector, and Fig. 37 is a schematic side elevation of the drive mechanism for the various sections of the machine.

I. MACHINE GENERALLY

The machine employs a series of individual, discrete, capsule-body forming pins 10 (Figs. 1, and 2 to 8) and a companion series of discrete capsule-cap forming pins 11 (see Fig. 18). The cap and body series are mounted in spaced, oppositely disposed relation with repect to each other. Each pair of cap and body pins 10, 11 is arranged to be moved synchronously and guidedly along identical, spaced, parallel paths provided for its respective series and each pin pushes the next adjoining pin throughout substantial portions of the respective cap and body pin-paths, a very slight clearance being provided between the adjoining pins of each series.

The means for imparting movement to the pins is provided at the operation performing stations and at spaced intervals along the paths of each series.

The construction of the machine and steps of operations performed at the successive stations which are located along and integrated with the cap and body pin-paths are identical for each series. hence, in the interests of brevity, only the capsule body forming side of the machine will be herein described in detail except as where in joining the capsule cap and capsule body parts the two (cap and body) sides of the machine function together in intimate dependence.

The machine may be used to form capsules from different materials such as gelatin, methylcellulose, and the like. When gelatin capsules are to be formed the gelatin solution must be maintained at a temperature which is somewhat higher than that of the pins, and, the pins preferably are greased just prior to the dipping operation. When methylcellulose capsules are to be formed, the temperature of the pins must be maintained somewhat higher than that of the methycellulose solution and the pins preferably are wiped just prior to the dipping operation. Provision is made for conveniently and readily controlling the temperature of the pins preparatory to their being introduced to the dipping station as well as for controlling the temperature of the capsule forming material (gelatin, methylcellulose or otherwise) provided at the dipping station.

II. SEQUENCE OF OPERATIONS

Referring to Fig. 1, generally, and to Figs. 2 to 10, particularly, the pins 10 are moved from a pin temperature controlling station T (Fig. 2) to a pin wiping or greasing station W (Fig. 3), thence to a dipping station D (Fig. 4) where the pins are lowered into a capsule part-forming solution to a predetermined extent and for a sufficient period of time to permit a given amount of the solution to collect on each pin.

From dipping station D the pins are immediately caused to spiral through a gyrating station G (Fig. 5), and are then fed through a rotating station R (Fig. 6). The spiralling or gyrating of the pins distributes the liquid capsule-part forming material longitudinally thereof, and the rotation of the pins about their axes distributes the material circumferentially thereover, these operations taking place prior to the complete gelation of the material which latter is accomplished by the time the pins approach the egress end of rotating station R.

Following such even and uniform distribution of the material over and about the surfaces of the pins, they are fed downwardly from rotating station R into an enclosed drying oven or kiln K (Fig. 7). In kiln K the pins are guidedly pushed continuously and progressively along and between spaced, parallel, horizontally disposed, guide-track members arranged in multiple paired tiers, the pins being transferred from one tier to the next at the oppositely disposed ends of said track members. This arrangement provides an extensive, circuitous and winding path over which the pins continuously and progressively travel for the purpose of drying the coatings formed thereupon.

Following their passage through the kiln K, the pins are fed from the forward end of the machine from the egress end of kiln K downwardly, through suitable guide-track members to a stripping station S (Fig. 8) where the dried capsule parts formed upon the pins are stripped therefrom and inserted and positioned in holders such as shown in Fig. 9.

From the stripping station S, the stripped pins are continuously and progressively fed back to the temperature controlling station T to pass again through the cycle just described and, simultaneously, the holders carrying the stripped capsule parts are continuously and progressively carried to a finishing station F (Fig. 9) where the parts are trimmed to precisely the correct length. From finishing station F the parts, still being carried in the holders, are fed continuously and progressively to a joining station J (Fig. 10) where the cap and body parts are removed from their holders to respective cap and body joining blocks which blocks are moved continuously and progressively into close proximity to one another. When these joining blocks reach a close and aligned position, push rods engage the ends of the capsule parts and push them together to join the bodies within the caps. Following this operation, the joining blocks are retracted from their close, aligned position and the assembled capsules are permitted to drop upon a conveyor belt for delivery to a suitable container.

III. DETAILED DESCRIPTION

INDEX OF TOPICS

1. Capsule-Part Forming Pins
2. Pin Temperature Control Station
3. Pin Wiping Station
4. Pin Dipping Station
5. Pin Gyrating Station
6. Pin Rotating Station
7. Kiln
8. Capsule-Part Stripping Station
9. Capsule-Part Finishing Station
10. Capsule-Part Joining Station
11. The Machine Drive

1. *Capsule-part forming pins*

Pins 10 and 11 upon which, respectively, the capsule bodies and caps are formed are identical except that body pins 10 are slightly longer and of slightly lesser diameter than cap pins 11. The capsule cap conventionally is the shorter of the two capsule parts and therefore its forming pin is correspondingly of shorter length so that it will not be dipped into the capsule-part forming liquid to that extent to which its companion body-forming pin is dipped.

Referring to Figs. 2, 3 and 4, these capsule-part forming members each comprise a cylindrical base portion which is formed generally like a spool, i. e., having a reduced portion or hub 12 interconnecting parallel, oppositely disposed, larger cylindrical flanges 13 and 14. The pin 10, proper, projects at right angle from hub 12 and is tapered slightly axially thereof from said base portion toward its outer, rounded, free end. This taper facilitates and expedites the removal of the formed capsule parts from the pins. Hub 12, together with flanges 13 and 14, constitutes a guide means adapted to co-operate with a track arrangement provided on the machine to form a path for the pins. Generally, such track arrangements is formed by two opposed strip members of stock of such thickness as to just fit with sliding clearance between the space provided between flanges 13 and 14, the inner edges of said track members providing a sufficient space to just receive with sliding clearance hub 12.

From this it is seen that the pins, once they are mounted in the machine, are guidedly directed by the track members (and, as will later appear, by the operation performing stations) along a predetermined path. The pins are arranged in the machine side by side in closed formation (see Fig. 7) and with just sufficient tangential clearance between their flanges to insure their free movement in making turns in horizontal, vertical, and intermediate planes without impedance or interference to the smooth and ready pushing movement of one by the other progressively along the path.

It is noted that for the purposes of clarity in illustration certain of the figures, schematically, only indicate the pins at particularly pertinent points along their path. It should be understood, however, that actually the pins substantially completely fill up the path throughout the entire machine as suggested by the showing in Fig. 7.

Should one or more pins become damaged, such pin or pins, individually, may be readily and easily removed and replaced without disturbance to adjoining pins in a manner hereinafter appearing.

Movement is imparted to the pins at various points along the path by pin-driving means either organized into the structure forming the path solely for this purpose or associated with the operation performing stations which latter, it later will be seen, are integrally incorporated into the formation of the pin-path. Except for such movement as is directly imparted to the pins as they arrive at and pass through the points and stations above referred to, each pin receives its movement from the next adjoining pin. In this manner, the pins are seriatim, continuously, progressively, and without any interruption whatsoever, moved to, through and from the various operation performing stations from the moment of their being preheated or cooled at the pin temperature controlling station T, now to be described, to the moment of their return to such station for repassing therethrough, thus forming a continuous, completely closed circuit of the moving pins.

2. *Pin temperature control station*

As previously stated, it may be desirable to control the temperature of the capsule-part forming pins in accordance with the type of capsule-part forming material being used preparatory to their being advanced to dipping station D for the dipping operation. It is to be noted at the outset, that with certain types of methylcellulose capsule forming materials auxiliary preheating of the pins may be unnecessary, i. e., it may be that the pins will retain sufficient heat following their passage through drying kiln K to make unnecessary any further heating thereof. It is further to be noted that in making capsules of gelatin it may be necessary to cool the pins before the dipping operation. On the other hand, in using certain types of capsule forming materials, it may be desirable to dip the pins with the latter at simply normal room temperature. The present machine is equipped with means whereby all of these various pin temperature requirements may be quickly and easily met.

Referring now to Fig. 1, as before stated, the pins which have been stripped at the finishing station F are continuously and progressively pushed one by another to the temperature controlling station T. Station T comprises a horizontally disposed bar or track 15 of rectangular cross section which has an undercut slot 16 extending lengthwise thereof for guidedly receiving pins 10 as shown in Fig. 2. Track 15 is twisted gradually, transversely thereof through an angle of approximately 90° and is so mounted in the machine that the pins upon entering slot 16 are disposed horizontally (i. e., with their outer free ends projecting toward the reader as viewed in Fig. 1). As the pins push each other along slot 16 they are turned radially of track 15 through an arc of 90° into a vertically depending position as illustrated by pin 10 at the right-hand end of slot 16 in Fig. 1.

Referring now to Fig. 2, suitably supported in spaced relation from bar 15 there is provided a pair of spaced bars 17 which are formed longitudinally to follow the spiral path of the pins, the space 18 provided between the bars being such as to receive with ample clearance the outwardly projecting ends of pins 10. Bars 17 are connected by suitable electrical connections (not shown) with an electronic heater 19 (Fig. 18) preferably of the high frequency type. The transfer of heat from this induction heating unit is sufficient to heat the pins as they pass through space 18 surrounded by the induction coil, to the proper temperature in accordance with the special requirements of the particular capsule forming material being used. Coolant tubes 20 (Fig. 2) are mounted adjacent track 15 and bars 17 to prevent their being overheated and to aid in regulating the temperature of the pins. It will be understood that a coolant fluid may be constantly flowed through these tubes in well-known, conventional manner.

In instances where it is desired to precool pins 10 before introducing them to dipping station D it is merely necessary to turn off heater 19, and still permit the coolant to pass through tubes 20. This causes bars 15 and 17 to have a temperature substantially below that of normal room temperature and effects a cooling of the pins during their passage through temperature controlling station T.

Following the pin heating or cooling operation, the pins pass to wiping station W now to be described.

3. *Pin wiping station*

As the pins leave slot 16 of track 15 they enter (still in vertically depending position) into an aligned slot 21 (Fig. 11) by which they are directed to a continuously driven pin-driving wheel 22, the periphery of which is notched to receive and embrace hubs 12. Wheel 22 carries the pins through an arc of approximately 180° to the wiping station portion 23 of the pin-path where hubs 12 are embraced on one side by the periphery of a disk 24 secured to a driving gear 25 which latter and disk are mounted for free rotation about a stationary, vertically disposed shaft 26. The opposite sides of hubs 12 are embraced by an arcuately formed pin retaining track 27 fixed to a stationary housing 28 mounted upon shaft 26, the space between the inner edge of track 27 and the periphery of disk 24 being such as to receive hubs 12 with slight clearance.

As the hubs enter into portion 23 of the pin path, outer portions of upper flanges 13 of the pins lie upon the upper surfaces of track 27 and disk 24 and outer portions of lower flanges 14 extend beneath the lower surfaces of these elements. Traction rings 29 of rubber or other suitable friction material, fixed on the upper and lower surfaces of disk 24 adjacent its periphery, frictionally engage the peripheries of flanges 13 and 14 of each pin as it enters into and advances along portion 23 of the pin-path. Affixed to disk 24 for rotation therewith, is a large wheel 32 the periphery of which extends slightly beyond the periphery of disk 24. Wheel 32 has a series of uniformly spaced semicircular notches 33 therein (Figs. 3 and 11) adapted to embrace pins 10 just below flanges 14 and maintain the pins securely and properly spaced during their transit through wiping station W.

From the construction thus far described, it is seen that as the pins enter into portion 23 of the path, rotating traction rings 29 yieldingly press hubs 12 of the pins against stationary track 27. Since pins 10 are securely embraced within notches 33 of rotating wheel 32 the pins advance in uniformly spaced relation through this arcuate portion 23 of the path and, simultaneously, rotate about their axes by virtue of moving rings 29 rolling hubs 12 of the pins along stationary track 27. Beneath wheel 32 there is secured to shaft 26 by means of a removable key 34, a wiping member 35 which is of arcuate formation and supports flatly against its outer upstanding edge a vertically disposed pad 36 of fibrous material such as felt or the like which yieldingly is pressed into wiping contact with pins 10. Pad 36 is substantially coextensive in height with a major portion of the depending pins. Hence, as the pins are rotatably moved through portion 23 of the path as just described, they are completely and thoroughly wiped by pad 36. Replacement or treatment of pad 36 may be easily effected by removing key 34 to permit lowering of plate 35 on shaft 26 a distance sufficient to render the pad conveniently accessible.

In making methylcellulose capsules it has been found advantageous to thoroughly wipe the pins dry and clean before they enter the dipping station and the above means provides efficient and effective mechanism for accomplishing this operation.

In making gelatin capsules, it has been found desirable to precoat the pins with a lubricating film. This is readily accomplished on the present machine by simply impregnating pad 36 with such lubricant so that a film thereof will be wiped therefrom onto the pins as the latter are rotated over the surface of the pad.

Following the wiping operation the pins are removed from wheel 32 by means of a continuously driven pin transfer wheel 37 to dipping station D. Wheel 37 lies in the plane of and has its periphery tangent with the periphery of disk 24. Spaced notches 38 provided in the periphery of wheel 37 are adapted to removably but securely receive hubs 12 of the pins with portions of flanges 13 and 14 embracing the upper and lower surfaces of wheel 37 adjacent notches 38. As pins 10 reach the end of their movement through wiping station W and are released from the confining influence of retaining track 27, the outward pressure of traction rings 29 against flanges 13, 14 causes hubs 12 to seat securely in notches 38 of wheel 37. A retaining guide track 39 is fixed in spaced relation from the periphery of wheel 37 to maintain the pins in mounted position upon the wheel until they reach a point of transfer where they enter the dipping station now to be described.

4. Pin Dipping Station

Referring now to Figs. 4, 11 and 13, dipping station D comprises a continuously driven turntable 42 suitably mounted upon roller bearings such as 43 for free rotation about a vertically disposed stationary shaft 44. A cylindrical housing 45 secured at its lower end to turntable 42 is rotatable therewith. The periphery of turntable 42 has affixed thereto a ring gear 46 meshing with a driving gear 47 which is continuously driven to rotate turntable 42 and housing 45 about shaft 44. The units for dipping the pins comprise pairs of vertically disposed rods 48 mounted within housing 45 for vertical reciprocatory movement in sleeve bearings such as 49 adjacent their upper ends and sleeve bearings 52 adjacent their lower ends. Upper bearings 49 are mounted in inwardly extending projections 53 formed internally of housing 45 and bearings 52 are mounted in suitable openings provided in turntable 42.

Each pair of rods 48 is coupled together as a unit by blocks 54 secured to the rods as by means of screws 55 (Fig. 13). Each block 54 carries an inwardly projecting stub shaft 56 upon which is rotatably mounted a roller 57. Normally, rollers 57 lie in contact with a cam surface 58 of a ring cam 59 fixed to stationary shaft 44.

The lower ends of each pair of rods 48 have affixed thereto notched, sector-shaped pin carriers 62 adapted to removably receive the pins from wheel 37. The notches of carriers 62 are each of such size as to snugly but removably embrace hubs 12 of the pins with upper flanges 13 seating upon the upper surfaces of the carriers. Plates 63 having spaced individual spring fingers 64 overlying each notch of each carrier 62 are secured to the upper surfaces thereof, the clearance between the upper surfaces of the notched portions of carriers 62 and the lower surfaces of spring fingers 64 being slightly less than the thickness of upper flanges 13 of pins 10.

As carriers 62 advance in counterclockwise direction (see arrow shown in Fig. 11) to that point where their notches are in alignment with notches 38 of transfer wheel 37 which latter continuously rotates in a clockwise direction, the carriers are elevated by cam surface 58 into the plane of wheel 37. At this coplanar, tangential point, pins 10 carried by wheel 37 are continuously and progressively thrust thereby into the notches of the carriers and upper flanges 13 simultaneously are yieldingly wedged between spring fingers 64 and the upper surfaces of the carriers.

The pins are continuously conveyed through the dipping portion of the pin-path by carriers 62 which lower the pins abruptly, by virtue of a dropoff in cam surface 58, to an extent sufficient to cause the depending pins to be lowered a predetermined extent into a dip pan indicated generally at 65. The dip pan contains the capsule part-forming material. As the pins continue in rotation about this arcuate portion of the pin-path, cam surface 58 gradually and progressively elevates rollers 57, rods 48 and carriers 62 to raise and smoothly and gradually withdraw the pins from the capsule part-forming material.

Dip pan 65 is mounted directly below turntable 42 upon a stationary table 66 fixed to shaft 44. The dip pan comprises an inner, cylindrical, open-topped channel or dipping compartment 67 supported by spaced arms 68 for rotation within an intermediate, cylindrical, open-topped channel or supply compartment 69 which is fixedly mounted within an outer cylindrical, closed-topped channel or temperature controlling compartment 72 fixed to table 66.

The inner ends of arms 68 are secured to a hub 73 journalled for rotation about shaft 44. Hub 73, arms 68 and compartment 67 are continuously driven in rotation by means of a ring gear 74 fixed to the hub of and meshing with a pinion 75 driven by driving means later to be described. Suffice it now to say that compartment 67 is continuously driven in rotation in a counterclockwise direction, i. e., in the same direction as the direction of travel of pins 10 through the dipping station and that the rate of rotation of compartment 67 is substantially the same as the rate of travel of the pins through this station. This tends toward rendering more nearly uniform the quantity of coating collected upon each of the pins. In other words, if the capsule part-forming material remained stationary while the pins were moved therethrough, the wake created in the material would tend toward causing the coating material collected upon the pins to vary markedly in quantity.

At spaced intervals along the bottom of dipping compartment 67 there are provided enclosed gear pumps 76, the enclosures of which have an opening such as 77 (Fig. 13) leading into supply compartment 69. Each gear pump 76 has a driving gear 78 meshing with a ring gear 79 secured adjacent the lower inner corner of supply compartment 69. Hence, as dipping compartment 67 rotates within supply compartment 69 gears 78 cause gear pumps 76 to rotate and this causes the capsule part-forming material to be continuously pumped from supply compartment 69 through openings 77 into dipping compartment 67. In this manner, the coating material is kept in constant circulation and agitated to an extent sufficient to prevent the formation of a surface skin or false body in the solution. The gear pumps also maintain the coating material at the proper level in inner compartment 67. It will be understood that the coating material may be piped directly to supply compartment 69 in any suitable manner.

Temperature control compartment 72 which surrounds supply compartment 69 at its sides and bottom is arranged to have a continuous supply of water passing therethrough. In the case of the capsule part-forming material being methylcellulose, the water serves as a coolant to maintain the methylcellulose at the proper temperature for receiving the heated pins.

Where the capsules are to be formed of gelatin the water passing through temperature control compartment 72 is heated to maintain the gelatin at proper temperature for receiving the cooled pins. For the purposes of heating the water, plates such as 82 (Fig. 13) may be removed from openings such as 83 provided in table 66 and heating elements (not shown) inserted within openings 83.

Provision is made on this machine to permit turntable 42 to rotate and carry pins 10 around the pin-dipping, arcuate portion of their path without simultaneously imparting vertical motion to the pins. This permits the maintaining of continuous and uninterrupted movement of the pins through the machine without their being coated and is useful particularly in connection with removing and replacing any defective pins. The manner of such removal and replacement of the pins will be hereinafter described.

The dipping disabling mechanism is clearly shown in Figs. 13, 14 and 15, and includes a plurality of slides 84, one for each pin carrier unit 62, that are disposed radially of shaft 44. Slides 84 are mounted for sliding movement radially of the shaft between an upper plate 85 and a lower plate 86, conformably shaped spacers 81 being secured between the slides (Fig. 15) to guide their movement. Depending rollers 87 attached to each slide 84 project downwardly through radially disposed elongated slots 88 provided in lower plate 86. The outer and inner ends of slots 88 limit the extent of inward and outward sliding movement which may be imparted to the slides. Movement of the slides from their inward positions as shown in Fig. 13 to their outward positions as shown in Fig. 14 is controlled by a movable cam member 89 which is secured to one end of a rod 92. Rod 92 passes through an opening 93 in shaft 44 and is connected at its opposite end to a solenoid 94, which is arranged to be controlled by a suitable electric switch mechanism (not shown). When solenoid 94 is deenergized, a compression spring 95 (Fig. 14) encircling rod 92 and bearing at one end against cam 89 and at its opposite end against shaft 44 urges cam 89 to its outward position against a limit stop 96 as shown in Fig. 14. In this position a curved face 97 of cam 89 is brought into the path of rollers 87 and as the rollers engage against face 97 slides 84 are cammed outwardly so that their outer ends are projected beneath stub shafts 56 which, at this time are elevated by their riding along a high point of cam surface 58 in a plane just above the upper surfaces of slides 84. In this manner carrier units 62 are latched in ineffective position but only with respect to their being raised or lowered into and out of dipping compartment 67.

Upon energizing solenoid 94 rod 92 is pulled to the left as viewed in Fig. 14 against the tension of spring 95. This movement moves cam member 89 to a position where a curved face 98 of the cam is brought into the path of rollers 87. Referring to Fig. 15, it is seen that as the rollers engage face 98, slides 84 are cammed inwardly to the position shown in Fig. 13 and their outer ends withdrawn from beneath stub shafts 56 so that the carrier units 62 are unlatched and free to be raised and lowered into and out of dipping compartment 67 by their rollers 57 riding along surface 58 of cam 59.

Following the dipping operation the dipped pins are continuously and progressively removed from the notches in carriers 62 by means of a continuously driven pin-driving wheel 99, similar to pin-driving wheel 22. The periphery of wheel 99 is notched to receive and embrace hubs 12. A retaining track 102 is affixed in spaced relation circumferentially about a portion of wheel 99, the leading bevelled end 103 of said track being adapted to engage hubs 12 of the pins as the hubs come into alignment, one after another, with the notches in wheel 99. End 103 serves to positively withdraw flanges 13 from engagement with spring fingers 64 and to socket the hubs securely in the notches of wheel 99 whereby the pins are continuously and progressively advanced to gyrating station G now to be described.

5. Pin gyrating station

Wheel 99 carries the pins through an arc of approximately 180° into a longitudinally extending spiralled slot 104 (Figs. 5 and 11) formed in a horizontally disposed cylindrical bar 105 which is suitably mounted in the machine between dipping station D and rotating station R. Slot 104 is undercut to slidably receive flanges 13 of the pins and the diameter of the slot outwardly from the undercut portion is such as to just receive with sliding clearance, hubs 12 of the pins. The pins are fed into this slot from wheel 99 in vertical position and are advanced along the slot by a pushing movement imparted from one pin to another. During their spiral travel the pins are moved from vertically depending position at the bottom of bar 105 upwardly into horizontal position on the inside of the bar, thence, further upwardly to an upright vertical position atop bar 105 and thence downwardly and finally back into a horizontal position on the outside of the bar. As the pins are progressively spiralled or gyrated through this arc of approximately 270°, the capsule part-forming material is distributed thoroughly and evenly, longitudinally of the pins. It is noted that this material distributing operation is performed before the material has taken its initial set.

The pins are pushed one by another out of gyrating station G toward a continuously driven pin-driving wheel 106 similar to pin driving wheels 22 and 99 except that the wheel 106 is disposed in a vertical plane whereas wheels 22 and 99 are disposed horizontally. Wheel 106 has a notched periphery which engages hubs 12 and carries the pins through an arc of approximately 180° into the pin spinning or rotating station R.

6. Pin rotating station

Referring now to Figs. 6 and 17 it is seen that the pin rotating mechanism is somewhat similar in construction to that mechanism described in the foregoing under the topic of "Pin wiping station." Wheel 106 advances the pins to the rotating station, portion 107 of the pin-path where hubs 12 are embraced on one side by the periphery of a disk 108 keyed to a horizontally disposed shaft 109 which is adapted to be continuosuly driven in rotation in a clockwise direction as viewed in Fig. 6, by driving means later to described. The opposite sides of hubs 12 are embraced by an arcuately formed pin retaining track 112 fixed to a stationary housing 113 secured on the machine frame, the space between the inner edge of track 112 and the periphery of disk 108 being such as to receive hubs 12 with but slight clearance.

As hubs 12 of the pins enter into portion 107 of the pin-path, their flanges 13 and 14 embrace, respectively, the inner and outer surfaces of track 112 and disk 108 adjacent to their opposed path-forming edges Traction rings 114 of rubber or other suitatble friction material, fixed on the inner and outer surfaces of disk 108 adjacent its periphery, frictionally engage the peripheries of flanges 13 and 14 of each pin as it enters and advances along portion 107 of the pin-path. A pin-spacing disk 115 of slightly larger diameter than disk 108 is mounted for free rotation upon the outer, reduced end of shaft 109. Disk 115 is provided along its periphery with spaced, semicircular notches 116 (Fig. 6) adapted to embrace pins 10 immediately adjacent the outer surfaces of flanges 14 and thus maintain the pins securely and properly spaced during their transit through rotating station R, the pins being, one after another, pushed into the notches as the latter come into radial alignment with the notches of pin-driving wheel 106.

From the construction just described, it is seen that as the pins enter into the portion 107 of the pin-path, the continuously rotating traction rings 114 yieldingly press hubs 12 against stationary track 112. Since pins 10 are embraced within notches 116 of disk 115 the pins advance clockwise around shaft 109 in uniformly spaced relation through this arcuate portion 107 of the path and, simultaneously, are rotated about their axes by virtue rotating rings 114 rolling hubs 12 of the pins along stationary track 112.

As the pins are progressively advanced and rotated through this arc of substantially 340°, the capsule part-forming material is distributed thoroughly and evenly circumferentially of the pins. It is noted that this spinning or rotating operation is performed before the capsule part-forming material has completed its gelation.

The longitudinal and circumferential distribution of the material about the pins at the gyrating and rotating stations insures that the capsule forming material will be thoroughly and uniformly distributed lengthwise of and around the pins and thus the walls of the finished capsules will have a high degree of uniformity in thickness throughout.

At the egress end of station R indicated at 117 in Fig. 6, hubs 12 of the pins are engaged by peripheral notches of a continuously driven pin-driving wheel 118 which wheel transfers the pins to an angularly disposed descending portion 119 of the pin-path which carries the pins to the drying kiln K now to be described.

7. Kiln

Suitable guide means 120 (Figs. 6 and 7) provided adjacent pin-driving wheel 118 directs the pins into portion 119 of the pin-path. This portion 119 is formed by a pair of angularly disposed, spaced bars or tracks 111, suitably affixed to the machine frame, the space between the tracks being just sufficient to embrace hubs 12 between flanges 13 and 14 with sliding clearance so that the pins may push one another through portion 119 of the pin-path under the impetus given them by the pin-driving wheel 118 as aided by the forces of gravity.

Toward the lower end of portion 119, the path is curved and merges into a capsule-part drying portion 121 of the pin-path. Portion 121 is extremely extensive in length (Fig. 1) and is formed by multiple, paired, horizontally disposed bars or tracks 122 and 123 suitably affixed, tier upon tier to spaced, upright, gear housing columns 124 which constitute a part of the machine frame. The opopsed edges of tracks 122, 123 define portion 121 of the path and the space between these edges is just sufficient to receive with sliding clearance hubs 12 of the pins 10 with flanges 13 and 14 disposed on the opposed sides of the tracks. Centrally of and adjacent to the left end of each track 123 there are provided continuously driven pin-driving wheels 125 having notched peripheries which extend into portion 121 of the pin-path between each pair of tracks 123, 122.

Centrally of and adjacent to the right end of each track 122 there are likewise provided continuously driven, pin-driving wheels 126 having notched peripheries similarly extending into the portion 121 of the pin-path between each pair of tracks 123, 122. Centrally, intermediate the left and right ends of tracks 123 there are provided continuously driven pin-driving wheels 127 having notched peripheries which extend into the portion 121 of the pin-path between each pair of tracks 123, 122. As viewed in Fig. 7, pin-driving wheels 125 and 127 are driven in a clockwise direction whereas wheels 126 are driven in a counterclockwise direction.

Plates 128 spanning the left ends of tracks 122 and the right ends of tracks 123 are secured to the machine frame by screws 129 or the like. These plates have semicircular inner edges 132 disposed in spaced relation around the outer 180° of their corresponding pin-driving wheels 125 and 126. Plates 128 serve to retain pins 10 within the notches of the pin-driving wheels and also aid in directing the transfer of the pins from one tier to the next as the pins are continuously and progressively pushed along tracks 123, 122 one by another and by the pin-driving wheels 125, 126 and 127.

As shown by directional indicating arrows in Fig. 7, as the pins leave portion 119 of the pin-path, they engage within the notches of the first, lowermost, clockwise-driven wheel 125 which pushes the pins in a rightward direction toward intermediate wheel 127 which serves as a "booster" pushing station and continues the pins on their progressive movement to the right where they are engaged by the first, lowermost, counterclockwise-driven wheel 126. Wheel 126 cooperating with plate 128 transports the pins through an arc of 180° upwardly and thence moves them in a leftward direction toward the clockwise-driven "booster" wheel 127 which augments wheel 126 in pushing the pins leftwardly toward clockwise-driven wheel 125 which lies immediately above the first or lowermost wheel 125 just mentioned. This next higher wheel 125, cooperating with plate 128, moves the pins through an arc of 180° into the next higher tier of paired tracks 122, 123. Here, the pins are advanced toward the right by wheel 125 and "booster" wheel 127 toward the wheel 126 and so on.

To gain a clearer picture of the extent of travel imparted to the pins in the manner just described, reference to Fig. 1 suggests the number of tiers and winding movements leftwardly and rightwardly, back and forth, from wheels 125 to wheels 126 until the pins reach the uppermost tier shown on the right-hand side of Fig. 1. In this tier the pins are traveling in a leftward direction and the uppermost pair of tracks 122, 123 extend leftwardly toward a continuation of the kiln which lies forwardly of the machine immediately above the pin temperature controlling, wiping, dipping, gyrating and rotating stations described earlier herein.

Referring to Fig. 1, the leftward section of kiln K has a series of spaced, upright, gear housing columns 133 to which are affixed, tier upon tier, paired, spaced tracks 122, 123 definitive of and continuing portion 121 of the pin-path. Pin-driving wheels 134 and 135 corresponding to pin-driving wheels 125 and 127 are mounted on the right end and intermediate columns 133, respectively, of this continuing section of the kiln and are arranged to be driven continuously in rotation in a clockwise direction. Pin-driving wheels 136 corresponding to wheels 126 are mounted on the leftmost column 133 of this continuing section of kiln K and are arranged to be continuously driven in rotation in a counterclockwise direction. Hence, in the left section of kiln K the pins continue their broad, sinuous winding movement leftwardly and rightwardly, back and forth, but now descending from tier to tier of tracks 122, 123 until they reach the lowermost track 123 whereupon they are fed from the egress end of the kiln by the lower leftmost pin-driving wheel 136.

A housing 137 indicated in dot and dash lines in Fig. 1, an end view of which may be seen in full lines in Fig. 18, completely encloses the kiln from top to bottom, and at its ends and sides. Suitable air ducts 138 and 139 (Fig. 1) are provided at the rear end of the housing through which may be passed streams of air. It is noted that the air introduced through upper ducts 138 may be of a higher temperature than the air introduced through lower ducts 139. Referring to Fig. 18, suitable exhaust ducts 142 and 143 are provided forwardly of housing 137, to carry the air streams from the kiln back to the heater (not shown) from which it is reintroduced into intake ducts 138, 139. In this manner the temperature of kiln K may be regulated to the desired degree for drying the capsule parts formed upon pins 10 at the proper rate consistent with the particular type of material used in their formation.

It is noted that the opposed (cap and body pin) sides of housing 137 are each provided with doors (not shown) through which the operator may enter to inspect and service the enclosed pin and track mechanisms, just described, it being understood that ample clearance is provided between the walls of the housing and the outwardly projecting ends of the pins to permit such entry.

In the event that a pin is defective or becomes damaged it may be readily removed and replaced in the following manner. The particular damaged pin or pins are advanced through the machine until they reach one of the turnings at the ends of the tracks 122, 123, i. e., that point where they are entering into the notches of one of the wheels 125 or 126. At this point, the associated plate 128 is demounted by removing screws 129, the damaged pin or pins readily removed and replaced and the plate 128 remounted. It is here noted that in driving the pins through the machine for this purpose, the dipping-disabling mechanism may be placed in operation as described in an earlier section so that the pins will reach the point of removal in undipped condition.

From the lowermost tier of tracks 122, 123 on the forward section of kiln K, the pins are fed by the lowermost pin-driving wheel 136 into a vertically depending, channelled track 144 (Figs. 20 and 21) which directs the pins toward the capsule part stripping station now to be described.

8. *Capsule-part stripping station*

The capsule-part stripping station S together with the finishing and joining stations is mounted within a subassembly frame 145 (Figs. 1, 18 and 19) positioned transversely across the forward end of the machine. Frame 145 has a large opening 146 across which extend four horizontally disposed, stationary rods 147 the opposite ends of which are secured in the upright sides of the frame. A vertically disposed, shaft-supporting plate 148 is rigidly supported on rods 147 centrally of opening 146.

Toward the forward edge of plate 148 (Fig. 20) there is stationarily affixed a relatively short, horizontally disposed shaft 149 that extends through and has its opposite ends equi-spaced from the opposite sides of the plate. A pin-carrier, transfer disk 152 having its periphery notched to removably receive hubs 12 of the pins is mounted for free rotation on shaft 149 adjacent plate 148. The notched periphery of disk 152 is tangent to the longitudinal center of the channel of track 144 the lower end of which terminates flush with the plane of the horizontal center of disk 152.

A pin-carrier disk 154 at stripping station S is keyed to a driven, horizontally disposed shaft 155 and has its notched periphery meeting tangentially with the notched periphery of disk 152. Shaft 155 is journalled at its opposite ends in bearings such as 156 (Fig. 19) and, intermediate its ends, in a bearing 157.

A third, peripherally notched pin-carrier disk 158 (Fig. 20) is located at the capsule-part finishing station F. Disk 158, like disk 152, is mounted for free rotation on a relatively short, stationary shaft 159 similar to shaft 149 and similarly fixed to plate 148. A portion of the notched periphery of disk 158 meets tangentially with the notched periphery of disk 154 and another portion of its periphery meets tangentially with the longitudinal center of undercut slot 16 of track 16.

Arcuately formed retaining tracks 153 are secured to plate 148 in spaced relation from the notched peripheries of disks 152, 154 and 158 to slidably embrace the sides of the hubs 12 of the pins which sides lie opposite to the sides embraced within the notches of the disks, the tracks 153 being coextensive with those portions of the peripheries of the disks lying between their points of tangency with each other and with tracks 144 and 15. Extensions such as 151, secured at the opposite sides adjacent the inner ends of tracks 153 are arranged to engage flanges 13 and 14 of the pins to insure the effecting of a transfer of the pins from one disk to another.

Disks 152 and 158 are driven continuously in rotation in a counterclockwise direction about their respective shafts 149 and 157 by virtue of hubs 12 of pins 10 being embraced on their opposite sides by the notches in the peripheries of disks 152, 154 and 158 at those points where the peripheries of the disks are tangent to each other, disk 154 being the only disk of the group which receives direct drive in a clockwise direction through shaft 155 which is continuously driven in rotation by mechanism to be later described under the topic "Machine drive."

By the construction and arrangement just described, and referring particularly to Fig. 20, it is seen that the pins are continuously and progressively fed downwardly through track 144, into the notches of disk 152. Disk 152, rotating in a counterclockwise direction, carries the pins counterclockwise through an arc of approximately 225° around to the point of tangency with disk 154 where the pins transfer into the notches of that disk which, being continuously driven in a clockwise direction, carries the pins clockwise through an arc of approximately 270° around to the point of tangency with disk 158 where the pins are transferred to the latter which, being driven in a counterclockwise direction, carries the pins counterclockwise through an arc of approximately 135° around and into the undercut slot 16 of track 15 of the pin temperature control station T for recommencement of another cycle through the machine. This multiple reversed curve portion of the pin-path completes and renders endless such path.

At stripping station S, a series of collets or holders 162 (Figs. 19 and 22) is arranged to be carried in axial alignment with and spaced relation from the outwardly projecting, free rounded ends of the pins. Holders 162 are arranged to be continuously and progressively advanced synchronously with the advance of the pins through the stripping station so that the capsule parts may be stripped or removed from the pins and placed in holders 162 for subsequent finishing and joining operations.

Referring to Fig. 24, each holder 162 comprises an outer, cylindrical, bearing sleeve having rimmed ends 163. An inner sleeve 161 is rotatably mounted within each holder, the inner sleeve being secured in its assembled rotatable relation by a knurled nut 165. Within each inner sleeve 161 of each holder 162 there is slidably mounted a slotted, tapered chuck jaw unit 164. A compression spring 166 encircling an outwardly projecting shank formed on the outer end of each chuck jaw unit 164 and extending between nut 165 and a retaining clip 167 normally urges the tapered, flexible chuck jaws into a correspondingly tapered seat 160 formed internally adjacent to the inner end of sleeve 161 thereby normally maintaining the chuck jaws in a closed position. Upon inward pushing movement being imparted to clip 167 or the outer end of the shank of unit 164, the jaws are pushed, against the tension of spring 166, away from jaw-closing seat 160 into open position as shown in Fig. 24.

Referring to Fig. 19, holders 162 are carried by a drum member generally indicated at 168. Drum member 168 is formed by two circular, inner and outer, end-pieces 169 and 172, respectively, that are keyed as at 173 and 174 to shaft 155 for rotation therewith. A series of paired, spaced horizontally extending rods 175 (see also Fig. 22) slidably mounted in sleeve bearings 176 adjacent the peripheries of end pieces 169 and 172 complete the drum member assembly 168. Projecting inwardly from end-piece 169 toward and meeting with disk 154 (Fig. 20) is a cylindrical extension 177 which is preferably secured to disk 154. It will be remembered that disk 154 is keyed to shaft 155, hence, drum member 168 and disk 154 rotate with shaft 155, together, as a unit. The periphery of end-piece 169 is formed with a paired series of spaced notches 178 (Figs. 22 and 24) adapted to snugly but removably receive holders 162 adjacent rimmed ends 163, the latter serving to retain the holders against lateral movement. Notches 178 are somewhat larger than the notches of pin-carrier disk 154 which receive the hubs of pins 10 and are in concentric alignment with the latter so that axial alignment of the pins with the apertures of chucks 164 is insured.

A relatively narrow drum member 179 (Fig. 22) is mounted for free rotation on shaft 149 adjacent pin-carrier disk 152, the drum member being secured to the disk. An additional relatively narrow drum member 182 is mounted for free rotation upon shaft 159 adjacent and affixed to pin-carrier disk 158. The peripheries of drum members 179 and 182 have spaced notches 183 and 184, respectively, similar to notches 178 of drum member 168 for removably receiving holders 162. The periphery of drum members 179 and 182 meet tangentially with the notched periphery of drum member 168.

A fourth drum member generally indicated at 185 (Figs. 19 and 22) similar to drum member 168 is keyed as at 186 to a shaft 187 which is suitably journalled at its opposite ends in bearings (not shown) similar to bearing 156 in the upright members of frame 145 and intermediate its ends in a bearing (not shown) provided in plate 148. Shaft 187 is located in vertical alignment with and directly beneath shaft 155 and is continuously driven in a clockwise direction in a manner to be later described.

Referring to Fig. 31, drum member 185 is formed by two circular, inner and outer, end-pieces 188 and 189, respectively, keyed to shaft 187 for rotation therewith. Paired, spaced, horizontally extending rods 192 slidably mounted in sleeve bearings 193 adjacent the peripheries of end-pieces 188 and 189 complete the drum member assembly 185. The periphery of end-piece 188 is formed with a paired series of spaced notches 194 (Figs. 22 and 31) which notches, like notches 178, are adapted to snugly but removably receive holders 162 adjacent their rimmed ends 163, the latter serving to retain the holders against lateral movement.

Arcuately formed retainers 195 are secured to stationary rods 147 in spaced relation from the notched peripheries of drum members 168 and 185 to slidably embrace and retain holders 162 within the notches. Short arcuate retainers 196 (Fig. 22) are secured to plate 148 in spaced relation from the notched peripheries of drum members 179 and 182 between those portions of the drum members which lie between their points of tangency with the notched peripheries of drum members 168 and 185 to retain holders 162 within the notches of drum members 179 and 182. The opposed ends of members 196 spacedly overlap the ends of members 195 at the points of tangency between the peripheries of drum members 179 and 182 with the peripheries of drum members 168 and 185 to insure the effecting of a transfer of holders 162 from one drum member to another. From the construction just described it is seen, particularly with reference to Fig. 22, that an endless path generally in the shape of a figure 8 is formed, through which holders 162 are continuously and progressively advanced synchronously with the advance of the capsule-part forming pins through stripping station S.

Each pair of rods 175 has secured to its inner ends a stripping unit 197. Stripping units 197 are best shown in Fig. 23 and each unit is provided with four, paired sets of stripping jaws 198 mounted between sector-shaped plates 199 and 202 secured together as by screws 201 (Fig. 24). The upper edges of plates 199 and 202 are scalloped as shown in Fig. 23 to provide clearance for flanges 14 of pins 10 and rims 163 of holders 162. Each pair of jaws 198 is fulcrumed as at 203 intermediate its ends (Fig. 8). Adjacent their lower ends the stripping jaws are provided with expansion springs 204 which normally urge their upper inner edges into engagement with each other as clearly shown in Figs. 8 and 23. Adjacent the upper ends of the jaws, each is provided with a semi-circular recess 205 adapted to tightly embrace pins 10 under pressure of springs 204. Above fulcrum 203 there are provided aligned, semi-circular openings 206 (best shown in Fig. 8) that are bevelled to provide a cam surface operative by a correspondingly bevel-ended cam-rod 207 to spread the jaws against the pressure of springs 204 in a manner later to be described.

Referring to Fig. 19, a drum cam 208 is mounted within drum member 168 upon shaft 155 on sleeve bearings 209 which permit free rotation of the shaft even though cam 208 is held stationary in a manner to be hereinafter described. Cam 208 is provided with three cam tracks 212, 213 and 214.

Each stripping unit 197 has a cam follower 215 embracing and secured to the unit's paired rods 175. Each follower 215 has a depending roller 216 riding in track 212, this track being effective to shift followers 215, rods 175 and stripping unit 197 laterally inwardly, toward flanges 14 of pins 10 and outwardly, away from flanges 14 toward chuck jaws 164.

Each stripping unit 197 has a cam follower 217 mounted for sliding movement upon the unit's paired rods 175. Each follower 217 has a series of inwardly extending cylindrical projections 218, one for each holder 162, for abutting the end 167 of chuck jaws 164 associated with the unit. Each follower 217 has a depending roller 219 riding in track 213, this track being effective to shift followers 217 laterally to move projections 218 toward and away from ends 167 of chuck jaws 164 to open and close the latter.

Each stripping unit 197 has a cam follower 222 mounted for sliding movement upon the unit's paired rods 175. Each follower 222 has adjustably affixed thereto four, spaced, horizontally disposed, capsule-part, positioning rods 223. Rods 223 are slidably mounted toward their free, inner ends in suitable bores provided in followers 217 and projections 218, the innermost ends of the rods projecting for a substantial distance into the bores of chuck jaws 164 and being slidable within such bores. Each follower 222 has a depending roller 224 riding in track 214, this track being effective to shift followers 222 and rods 223 laterally to position the capsule-parts within the chuck jaws before the latter are closed upon the capsule-parts.

Stripping jaw cam-rods 207, there being one for each pair of jaws 198 in each unit 197, are mounted adjacent their outer ends for lateral sliding movement in bores provided in cam follower 215 with their outermost ends projecting a slight distance beyond the cam follower. Rods 207 pass through suitable aligned bores provided in follower 217 and its projections 218, end-piece 169, plate 202, openings 206 of the stripping jaws, and have their innermost, reduced ends, projecting through suitable openings provided in plate 199. Coil springs 225, inferior to stripping-jaw springs 204 and connected at one end to upstanding studs 226 fixed in follower 215 and at their opposite ends to upstanding pins of blocks 227 secured to rods 207, normally urge rods 207 outwardly with blocks 227 abutting against the inner end of follower 215.

Each stripping unit 197 has a plate 228 slidably mounted upon rods 175 of the unit and affixed by screws and spacers 229 to its cam follower 222. Plates 228 are arranged to engage the outermost ends of rods 207 and push the rods inwardly. Inward movement of rods 207 causes the inner, bevelled, cam-ends of the rods to enter into bevelled openings 206 and thus force jaws 198 apart.

Referring now to Figs. 24 through 28, the sequence of operations as performed by one of the stripping units 197 during one complete cycle of drum member 168 around cam 208 will be described, it being borne in mind that drum member 168 is continuously rotating and that, one after another, each stripping unit cyclically performs identical operations in identical manner as it rotates around cam 208.

Shortly after pins 10 enter notches 178 of disk 154, a stripping unit 197, with its jaws 198 held in open position by rods 207, moves inwardly to bring its semicircular recesses 205 into embracing relation with a group of four pins lying opposite thereto. This movement is effected by follower 215 and rods 175, the parts occupying the positions shown in Fig. 24 where jaws 198 are closed upon the pins at a point adjacent their flanges 14 and behind the inner ends of the formed capsule parts. Further clockwise rotation of disk 154 and drum member 168 causes track 212 to move roller 216, rods 175 and stripping unit 197 laterally, outwardly, to the position shown in Fig. 25 whereupon jaws 198 of the stripping unit 197 start to strip the capsule-parts from pins 10 and cause the outer, rounded ends of the capsule-parts to enter into the receiving apertures of chuck jaws 164. Jaws 164 are, at this time, in open position having been forced into such position by projection 218, follower 217, roller 219 and cam track 213. As disk 154 and drum member 168 continue their clockwise rotation, track 212 moves roller 216, follower 215, rods 275 and stripping unit 197 laterally, to its extreme outermost position as shown in Fig. 26, where the capsule-parts are fully inserted within jaws 164 of holders 162. During this movement, jaws 164 are partially retracted within sleeves 161 by springs 166 as follower 217 is moved laterally in an outward direction by roller 219 riding in track 213. Jaws 164 are not, however, within sleeves 161 to an extent sufficient to fully close the jaws upon the capsule-parts.

As clockwise rotation of drum member 168 continues, roller 224 and cam track 214 move follower 222 laterally to its extreme inward position. This causes rods 223 to abut the outer, rounded ends of the capsule-parts and move them inwardly a predetermined extent in preparation for their delivery to the finishing station for the trimming or finishing operation later to be described. Concurrently with this positioning operation, plate 228 engages the outer ends of rods 207 and moves them inwardly, against the tension springs 225, a distance sufficient to thrust their inner, bevelled cam-ends into the correspondingly bevelled openings 206 to open stripping jaws 198 in readiness for the next placement of their openings 205 over another group of pins 10.

As clockwise rotation of drum member 168 continues, follower 222, rods 223 and plate 228 move outwardly to the position shown in Fig. 28. Concurrently, follower 217 and its abutting projections 218 are moved outwardly away from ends 167 of chuck jaws 164 and springs 166 simultaneously move the chuck jaws to their fully closed position to firmly grip the positioned capsule parts. Cam-rods remain securely clamped within openings 206 of jaws 198 by the action of springs 204 which, it will be remembered, are superior to springs 225. Hence, rods 207 become releasably but securely connected with their associated stripping unit 197 and its associated rods 175, follower 215 and roller 216 and will move as a unit with these parts to retain jaws 198 open until that unit 197 again reaches that point in the cycle indicated by the line 24—24 in Fig. 22; that is, that point where the parts take the position shown in Fig. 24. In this position, as follower 215 moves inwardly from the position shown in Fig. 28, rods 175 move inwardly and cause the innermost ends of cam-rods 207 to abut a face of disk 154 and thus arrest rods 207 against further inward movement. As rods 175 and stripping unit 197 move further inwardly to their innermost position shown in Fig. 24, the bevelled cam-ends of rods 207 are expelled from openings 206 in jaws 198, the bevel of the openings co-operating with the bevel of the cam-ends to aid in the expulsion. Concurrently, springs 225 restore rods 207 to the normal position shown in Fig. 24, with stops 227 abutting follower 217. Immediately upon the expulsion of rods 207 from openings 206, springs 204 press openings 205 into tight embrace around pins 10 and behind the capsule-parts in readiness for the removal operation as hitherto described.

From the foregoing, it is seen that the capsule-parts are continuously and progressively removed from the pins and positioned and secured within holders 162 without any interruption whatsoever to but concomitantly with the continuous and progressive advance of both the pins and the holders. Following the stripping, positioning and gripping of the capsule-parts within holders 162 the latter are advanced to capsule-part finishing station F now to be described.

9. *Capsule-part finishing station*

Referring to Fig. 22, holders 162 with the capsule-parts securely held within chuck jaws 164 are removed from notches 178 of drum member 168 by retainer 196 (at that point where the periphery of drum member 168 meets tangentially with the periphery of drum member 182) and transferred to notches 184 of drum member 192 which, being rotated in a counterclockwise direction, carries the holders downwardly through an arc of approximately 90° to drum member 185 of joining station J. During their transit through this 90° arc, a traction ring 228 of rubber or other suitable gripping material affixed to drum member 182 adjacent its periphery, frictionally engages knurled nuts 165 and yieldingly presses them against an arcuate shaped, traction segment 229 stationarily mounted in spaced, concentric relation with ring 228 on rods 230 fixed in plate 148 as clearly shown in Fig. 29. Since traction ring 228 is rotating and segment 229 is held stationary, the ring rolls nuts 165 along the segment and thereby continuously rotates inner sleeves 161 and chuck jaw units 164 within the notch-embraced outer bearing sleeves of holders 162 as the holders progressively and continuously advance through finishing station F. This imparts rotation to the gripped capsule-parts as they travel from stripping station S to joining station J.

The interior face of drum member 182 has adjustably secured thereon a plurality of radially disposed knives 232, the arrangement being such that one knife projects into each notch 184. Knives 232 have their keenly pointed outer ends projecting parallel to the plane of the exposed, inwardly projecting, uneven, open ends of the capsule-parts and in spaced relation from the rimmed ends 163 of holders 162 as clearly shown in Figs. 22, 29 and 30.

As holders 162 are continuously and progressively fed into rotating engagement with and between ring 228 and segment 229, the pointed ends of knives 232 engage and pierce the walls of the rotating capsule-parts and deftly and smoothly trim the excess material from their inwardly projecting ends. Since the parts are positively positioned at the stripping station with predetermined uniform lengths thereof lying within the holders as described in the foregoing, and since each knife 232 is affixed equi-distantly from the rimmed ends 163 of holders 162, capsule-parts of precisely uniform length are insured.

Referring to Figs. 22 and 29, a horizontally disposed, cylindrical duct 233 is suitably mounted on plate 148 in close proximity to segment 229. An opening 234 is provided in the duct at that portion which faces toward finishing station F. Duct 233 is connected to a vertically disposed duct 235 (Figs. 1 and 18) which leads to a suitable air suction pump (not shown). The current of air inrushing through opening 234 (Fig. 29) is sufficiently strong to sweep the severed trimmings through opening 234 into ducts 233 for deposition into a suitable receptacle (not shown) for salvage. Following this finishing operation, holders 162 are transferred from drum member 182 to drum member 185 at the capsule-part joining station now to be described.

10. Capsule-part joining station

As before stated, all of the operations which have been described up to this point, for forming capsule body parts upon pins 19 and removing and trimming such parts, are concurrently, progressively and continuously performed, in identical manner at corresponding stations on the capsule cap side of the machine in connection with cap forming pins 11 (Fig. 18). Hence, as holders 162, with finished capsule-body parts, are continuously and progressively advanced into the capsule body side of joining station J corresponding companion holders 162' (Fig. 32) with finished capsule-cap parts are concurrently continuously and progressively advanced into the capsule cap side of joining station J. Figs. 11, 17, 18 and 29 indicate to some extent certain of the counterpart stations of the cap side of the machine.

Referring to Fig. 22, holders 162 with the trimmed capsule-parts securely held within chuck jaws 164 are, at that point where the periphery of drum member 182 meets tangent with the periphery of drum member 185, removed by retainer 195 from notches 184 to notches 194 of drum member 185. Drum member 185, being rotated in a clockwise direction, carries the holders downwardly through an arc of substantially 135° thence upwardly through an arc of approximately 135° where they are transferred from notches 194 to notches 183 of drum member 179 for carriage back to stripping station S thus completing the continuous and progressive travel of the holders through their figure-8-shaped, endless, path as previously described.

Referring to Figs. 22 and 31, each pair of rods 192 of drum member 185 has secured to its inner ends a sector-shaped joining unit 236. Joining units 236 are best shown in Fig. 36 and each unit is provided with four paired sets of joining blocks 237 mounted in spaced relation in suitable recesses provided in the periphery of unit 236 and secured in such recesses by flat leaf springs 238 anchored by screws 239. The innermost end of each rod 192 is provided with a reduced, inwardly projecting, pilot stud 242.

The corresponding counterparts on the cap side of the machine are designated by like, but primed, reference numerals and correspond in detail with the parts associated with the body side of the machine except as hereinafter noted, one exception being that the innermost ends of rods 192' are provided with bores 243 (Fig. 32) to receive pilot studs 242.

Referring to Fig. 31, a drum cam 244 is mounted within drum member 185 upon shaft 187 (Fig. 22) on sleeve bearings (not shown, but similar to sleeve bearings 209 [Fig. 19]) which permit free rotation of shaft 187 even though cam 244 is held stationary in a manner to be hereinafter described. Cam 244 is provided with three cam tracks 245, 246 and 247. Each joining unit 236 has a cam follower 248 embracing and secured to the unit's paired rods 192. Each follower 248 has a depending roller 249 riding in track 245, this track being effective to shift followers 248, rods 192 and joining unit 236 laterally from the normal position adjacent chuck jaw unit 164 (Fig. 31), inwardly into juxtaposition with cap joining block 236' as shown in Fig. 32.

Each joining unit 236 has a cam follower 252 mounted for sliding movement upon the unit's paired rods 192. Each follower 252 has a series of inwardly extending cylindrical bosses 253, one for each holder 162, for abutting the ends 167 of chuck jaws 164 associated with the unit. Each follower 252 has a depending roller 254 riding in track 246, this track being effective to shift followers 252 laterally to move bosses 253 toward and away from ends 167 of chuck jaws 164 to open and close the latter.

Each joining unit 236 has a cam follower 255 mounted for sliding movement upon the unit's paired rods 192. Each follower 255 has adjustably affixed thereto four, spaced, horizontally disposed capsule-part, push rods 256. Rods 256 are slidably mounted toward their free, inner ends in suitable bores provided in followers 252 and bosses 253, the innermost ends of the rods entering for a substantial distance into the bores of chuck jaws 164. Each follower 255 has a depending roller 257 riding in track 247, this track being effective to shift followers 255 and rods 256 laterally to remove the capsule-parts from within chuck jaws 164 to joining blocks 237.

The capsule-part, cap and body receiving blocks 237' and 237, respectively, are clearly shown in Fig. 10. Each body block 237 is provided intermediate its ends with a cylindrical bore 258 of a diameter that snugly but slidably receives the capsule body. Bore 258 is chamfered at its outer end, and at its inner end enters into a larger counterbore 259 of just sufficient diameter to snugly but slidably receive the larger diametered capsule cap. A shoulder 262 formed at that point where counterbore 259 meets bore 258 provides a seat for the trimmed end of the capsule cap.

Each cap block 237' is provided with a cylindrical bore 263 of just sufficient diameter to snugly but slidably receive the capsule cap, the outer end of the bore being chamfered to aid in directing the cap part into the bore.

Referring now to Fig. 22 and to the series of Figs. 31 through 35, taken along the correspondingly numbered section lines of Fig. 22, the sequence of operations as performed by one of the joining units 236 will be described, it being borne in mind that drum member 185 is continuously rotating and that, one after another, each joining unit cyclically performs identical operations in identical manner as it rotates around cam 244.

Shortly after holders 162 enter notches 194 of drum member 185 they become axially aligned with a joining unit 236, and chuck jaws 164 are opened by bosses 253 on follower 252 the latter having been moved inwardly by roller 254 riding in track 248, an extent sufficient to open the jaws to release the capsule-parts for lateral movement.

As drum member 185 continues clockwise rotation, follower 255 moves laterally inwardly to the position shown in dotted lines in Fig. 31, as roller 257 follows along cam track 247. In this position, the innermost ends of push rods 256 are brought into contact with the closed, rounded ends of the capsule body parts. As drum member 185 continues in rotation, rods 256 move further inwardly to push the capsule-parts out of jaws 164 into bores 253 of blocks 237. When the capsule-parts are completely inserted within blocks 237, push rods 256 and the unit's paired rods 192 are pushed, jointly, by their respective followers 255 and 248 away from chuck jaws 164 laterally inwardly into joining position as shown in Fig. 32; that is, to a position where unit 236 lies in juxtaposition to unit 236' which latter unit is simultaneously moved inwardly in the same manner as unit 236 by corresponding cam track, roller, follower and rod counterparts on the cap side of the machine. As rods 192 and 192' approach the ends of their inward movements pilot studs 242 of rods 192 enter into recesses 243 of rods 192' to releasably join units 236 and 236' together, thereby assuring an initial and maintained, positive, precision axial alignment of body bores 258 and cap bores 263 (Fig. 10).

As drum 185 continues in rotation and after rods 192 and 192' have come to rest, first, rods 256' move further inwardly an extent sufficient to push the cap parts into body bores 258 a distance sufficient to push the trimmed ends of the caps flush against shoulders 262 as shown in Fig. 10 and then, rods 256 move further inwardly a distance sufficient to push the bodies into the caps a predetermined extent to effect a smooth, efficient joining of the caps and bodies.

Immediately following the joining of the parts, as drum member 185 continues in rotation, rods 256 and 256' remain at their innermost joining positions, just described, while units 236 and 236' simultaneously move, as shown in Fig. 33, back toward their normal positions adjacent chuck jaws 164. This retractive movement of units 236' and 236 withdraws their blocks 237' and 237, laterally from over their respective cap and body parts, and leaves the joined capsule free to fall from between the ends of push rods 256 and 256' as clearly shown in Fig. 34.

When units 236' and 236 reach that point in their return movement shown in Fig. 34, rods 256' and 256 commence again to move with the unit's paired rods 192' and 192 back toward normal position adjacent holders 162.

As drum member 185 continues in rotation the parts are fully restored to the normal position shown in Fig. 35 in readiness to be brought again into aligned association with holders 162 advancing into the joining station J from the finishing station F.

In moving from the position shown in Fig. 35 to the position shown in Fig. 31 followers 252 are moved laterally inwardly to open chuck jaws 164 of holders 162 preparatory to the capsule-part removing operation as above described.

Referring to Figs. 1, 18 and 37 the assembled capsules fall from between rods 256 and 256' (Fig. 34) upon a continuously moving, endless conveyor belt 264 which carries the capsules to a suitable receptacle (not shown).

It is noted that by joining the capsules in the manner described, capsules of markedly uniform over-all length are insured. On machines of this character hitherto provided, conventional methods of removing the assembled capsules involves pushing the assembled capsules out from within their joining blocks. With this method, the caps frequently bind in their bores and resist ejection, and the necessary pressure upon the body portions to effect ejection of the assembled capsules causes the body parts to enter further into the caps than desired. This results in assembled capsules of nonuniform length. Practical and efficient operation of modern capsule filling machines makes it imperative that the capsules supplied to such machines be of precision, uniform, over-all length. The present machine provides capsules that meet such requirements.

From the foregoing it is seen that the capsule-parts are continuously and progressively removed from the holders to the joining blocks and the latter moved to join the parts and then removed from over the assembled capsules without any interruption whatsoever to the continuous and progressive advance of both the joining units 236 and 236' and holders 162 in their respective endless paths.

11. *The machine drive*

Capsule conveyor belt 264 is continuously driven by an electric motor 265 (Figs. 18 and 37).

An electric motor such as 266 (Figs. 1 and 37) is provided on both the cap and body sides of the machine at dipping station D for driving inner compartment 67 (Fig. 13) of dip pan 65 continuously in rotation at a rate substantially the same as the rate of travel of the pins through the dipping station. Motor 266 is connected by belts and pulleys 267 and through a gear box 268 to a vertically disposed shaft 269. Pinion 75 which meshes with ring gear 74 of inner compartment 67 is suitably keyed to shaft 269.

Apart from motors 265 and 266 for driving belt 264 and compartment 67 as just described, the entire machine (both cap and body sides) is driven by a single main motor 272 (Figs. 1 and 37). Belt and pulley connections 273 connect motor 272 with a gear box 274 through which extends a vertically disposed shaft 275 journalled in suitable bearings (not shown) in the machine frame. The lower end of shaft 275 has affixed thereto a bevelled gear 276 meshing with a bevelled gear 277 secured on one end of a horizontally disposed shaft 278 which extends along the bottom of the machine and is journalled in suitable bearings (not shown). Toward its right end, shaft 278 has affixed thereto a series of bevelled gears 279 meshing with corresponding bevelled gears 280 secured on the lower ends of vertically disposed worm shafts 282, each of which shafts is journalled for rotation in the spaced, upright, gear housing columns 124 (Fig. 1) which constitute a part of the machine frame. Worm gears such as 283, affixed to transversely extending, horizontally disposed shafts 284 mesh with worms 282 within housings 124 and the opposite ends of the shafts are journalled in the sides of the housings, extend outwardly therethrough, and have mounted thereon pin driving wheels 125, 126, 127 shown in Fig. 1. It is noted that the meshing arrangement of gears 279 with gears 280 is such that the outer worm 282, adjacent the rear end of the machine, rotates in a direction opposite to the direction of rotation of the other two worms 282. Hence, as viewed in Fig. 1, clockwise rotation is imparted to wheels 125 and 127 whereas counterclockwise rotation is imparted to wheels 126.

The upper end of shaft 275 (Fig. 37) has affixed thereon a bevelled gear 285 meshing with a bevelled gear 286 keyed to a horizontally disposed shaft 287 suitably journalled in bearings mounted in the machine frame. Spaced, bevelled gears 288 keyed to shaft 287 mesh with corresponding bevelled gears 289 secured on the lower ends of vertically disposed worm shafts 292, each of which shafts is journalled for rotation in spaced, upright, gear housing columns 133 (Fig. 1) which constitute a part of the machine frame. Worm gears such as 293, affixed to transversely extending, horizontally disposed, shafts 294 mesh with worms 292 within housings 133 and the opposite ends of shafts 294 are journalled in the sides of the housings, extend outwardly therethrough, and have mounted thereon pin driving wheels 134, 135 and 136 shown in Fig. 1. It is noted that the meshing arrangement of gears 288 with gears 289 is such that the outer worm 292, adjacent the forward end of the machine, rotates in a direction opposite to the direction of rotation of the other two worms 292. Hence, as viewed in Fig. 1, clockwise rotation is imparted to wheels 134, 135 whereas counterclockwise rotation is imparted to wheels 136.

Referring to Fig. 37, worm shafts 292 and meshing worm gears 283 and worm shafts 292 and meshing worm gears 293 within the upright gear housing columns 124 and 133, respectively, may be maintained under constant lubrication by oil feeder lines 290 (Fig. 1) supplied by a pressure pump 291.

Affixed to shaft 275 (Fig. 37) above gear box 274 is a bevelled gear 295 meshing with a corresponding bevelled gear 296 affixed to a horizontally disposed worm shaft 297 which meshes with a worm gear 298 keyed to a vertically disposed shaft 299 journalled in suitable bearings provided in the machine frame. Pin-driving wheel 22 of pin wiping station W (Fig. 11) is secured to the lower end of shaft 299 which latter continuously drives wheel 22 in rotation to feed the pins into wiping station W as previously described. Also affixed to shaft 299 just above pin-driving wheel 22 is a gear 302 which, through meshing with one of a pair of intermeshing gears 303 (Fig. 11) the other gear of which pair meshes with gear 25 affixed to disk 24, imparts rotation to gear 25 to drive disk 24 in rotation at pin wiping station W as previously described.

Just below gear 285 (Fig. 37) there is affixed to shaft 275 a bevelled gear 304 meshing with a companion bevelled gear 305 which, through a gear housing 306, drives a vertically disposed shaft 307. Pin-transfer wheel 37 (Fig. 11) is affixed to the lower end of shaft 307 which shaft continuously drives the wheel in rotation to transfer the pins from wiping station W to dipping station D as previously described.

Gear 47 (Figs. 11 and 37) is affixed to shaft 307 above wheel 37 and, as earlier described, meshes with ring gear 46 to rotate the pin carrying turntable 42 at dipping station D.

Also affixed to shaft 307 a slight distance above gear 47 is a gear 308 meshing with an intermediate gear 309 affixed to an idler shaft 312. Gear 309 meshes with a pinion 313 secured on the upper end of a vertically disposed shaft 314 suitably journalled for rotation in the machine frame. The lower end of shaft 314 has secured thereon pin-driving wheel 99 and drives this wheel continuously in rotation, as previously described, to remove the dipped pins from turntable 42 to spiralled slot 104 of gyrating station G (Fig. 11).

Referring now to Figs. 17 and 37, shaft 109 at rotating station R, has keyed thereto a relatively large sprocket 315. Horizontally disposed shafts, such as, 316 mounted in suitable bearings at wiping station W, have secured on their outer ends smaller sprockets 317. An endless chain 318 passes over and around sprockets 315, 317 and further over and around a suitable tension sprocket 319 and two sprockets 320 affixed to two of the transversely extending shafts 284 of the kiln section K. The chain and sprocket assembly just described imparts continuous rotation to disks 108 and 115 of the pin rotating station R. Pin-driving wheels 106 and 118 (Fig. 6) at the pin rotation station R are affixed to the outer ends of shafts 316 and are continuously driven in rotation as their sprockets 317 are rotated by chain 318.

Referring to Fig. 37 adjacent the left end of shaft 287 within a housing 322 there is keyed to this shaft a worm 323. Worm 323 meshes with a worm gear 324 fixed to a horizontally disposed shaft 325 the oppositely disposed outer ends of which extend outwardly through the side walls of housing 322. A sprocket such as 326 is secured on the outer ends of shaft 325 and has an endless chain 327 passing therearound and over sprocket teeth 328 (Figs. 19 and 31) formed integrally on the peripheries of end-pieces 172 and 189. Idler sprockets 328' (Figs. 19 and 37) adjustably mounted in subassembly frame 145 are provided to tension chain 327 and maintain it in proper engagement with sprocket teeth 328 of end-pieces 172 and 189 and with sprocket 326. By the construction just described drum members 168 and 185 and their respective shafts 155 and 187 to which they are keyed are continuously driven in rotation.

The means for maintaining drum cams 208 and 264 (Figs. 19 and 31) stationary while drum members 168 and 185 and shafts 155 and 187 (Fig. 22) are driven in rotation will now be described. Referring to Fig. 19, a pinion 329 is affixed to one end of a stub shaft 332 passing through and journalled for rotation in a bearing such as 333 in end-piece 172. Pinion 329 meshes with ring-gear teeth 334 provided internally of an inwardly projecting cylindrical flange 335 provided on subassembly frame 145. The inner end of shaft 332 has affixed thereto a pinion 336 meshing with corresponding ring gear teeth 337 provided internally around an outwardly extending cylindrical projection 338 formed on the outer end of cam 208.

Hence, as drum member 168 together with its keyed shaft 155 is driven in rotation by chain 327, stub shaft 332 travels, in bearing 333, an orbital path around the axis of shaft 155. During such travel, shaft 332 is driven in rotation in bearing 333 about its own axis by pinion 329 meshing with teeth 334 of stationary flange 335. Since pinion 336 is secured on the opposite end of stub shaft 332 it, simultaneously, is driven in rotation about the axis of shaft 332 as the latter moves orbitally around the axis of shaft 155 and since the pinion 336 is in mesh with teeth 337 of cam drum 208 it constantly and effectively maintains the latter as stationary as if the cam drum were rigidly affixed to stationary frame 145. Bearings 209 of the cam drum, as previously described, permit free rotation of shaft 155.

By the terms "predetermined capsule making" or "capsule part-forming" operations as hereinafter used in the claims, is meant those operations such as have been described in the foregoing, i. e., operations including wiping or lubricating the pins, dipping the pins, distributing capsule-part forming material thereover, drying the films formed on said pins, stripping the capsule parts from said pins, trimming said parts, and joining the parts together.

By the term "spiralling" as hereinafter used in the claims is meant operations such as described under Topic 5 in the detailed description and the expression "means for spiralling" is definitive of a means for imparting translatory movement to the pins in a direction at normal to their longitudinal axes and simultaneously turning the pins bodily about the axis of their translatory movement.

In its ordinary sense when used in connection with machinery, the term "station" might carry with it an implication that the work passing therethrough came temporarily to rest while the particular operations to be performed at the "station" were carried out. However, the term is herein employed merely as a convenient expression of a situs where particular operations are performed and is not indicative of any delay, interruption or stoppage of the work in any manner whatsoever. A salient feature of the present machine is the thorough and complete elimination of any and all types of mechanism which might give pause to the continuous and progressive advance of the forming pins and the parts formed thereon in a smooth, constant and uninterrupted flow.

While the form of mechanism herein shown and described is admirably adapted to fulfill the objects primarily stated it is to be understood that it is not intended to confine the invention to the one form of embodiment herein disclosed for it is susceptible of embodiment in various forms all coming within the scope of the claims which follow.

What is claimed is:

1. In a capsule making machine comprising a frame having tiers of tracks fixed in spaced parallel relation thereon, a plurality of individual pins upon which the capsules are to be formed, each of said pins having an angularly disposed base adapted to be guidably mounted for sliding movement in the spaces between the tracks with the base of one pin in contact with the base of the next adjoining pin, and drive means including driven members disposed adjacent the ends of the tracks adapted to engage said bases and thereby continuously and progressively move the pins along the tracks and transmit the pins from one tier to the next.

2. In a capsule making machine, a series of individual unconnected pins upon which the parts of the capsules are to be formed; means including stationary track members adapted to support said pins in individual, independent, projecting, adjacent spaced relation for movement one by another in a path formed by said track members; means spaced along said path for performing predetermined capsule making operations; and means including the pins per se for continuously and progressively moving said pins along said path into operative association with and past said operation performing means.

3. In a capsule making machine, a series of discrete capsule part mold pins, means including stationary track members forming an endless path for guiding said pins for movement in a direction normal to their longitudinal axes, means spaced along and forming portions of said path for performing capsule part-forming operations upon said pins, said operations involving the imparting of reciprocatory, gyratory and rotary movements to said pins at different times and at different rates, and means including the pins per se for continuously advancing said pins in the direction of their travel along said path at a constant rate while said movements are imparted to said pins.

4. In a capsule making machine, a series of individual, unconnected pins upon which the parts of the capsules are to be formed; stationary track means for supporting said pins in projecting adjacent spaced relation for movement one by another in a path, means spaced along said path for performing predetermined capsule making operations, and means for continuously and progressively moving said pins along said path into operative association with and past said operation performing means, said latter means being operable to perform their respective operations synchronously and continuously without interruption to the continuous progressive movement of the pins along said path.

5. In a capsule making machine, a frame, tiers of tracks fixed in spaced parallel relation on said frame, arcuate plate members secured on said frame in spaced relation from and bridging alternate ends of said tracks, a plurality of individual pins upon which the capsules are to be formed, each of said pins having a base adapted to be mounted for guided sliding movement along the tracks in the spaces therebetween with the base of one pin contacting the base of the next adjoining pin, driven rotatable notched members adjacent the opposite ends of the tracks to form with the spaces between the tracks and said arcuate plate members a continuous path, the notches of said members being adapted to receive and embrace the bases and thereby push the pins along the tracks in opposite directions in adjoining tiers and transfer the pins from one tier to the next adjacent tier, and auxiliary rotatably driven notched members positioned intermediate the ends of the tracks between each pair of adjoining tiers also engageable with the bases and operable to aid in moving the pins along the tracks.

6. In a capsule making machine, a series of independent, individual, unconnected capsule part-forming pins; means including stationary track members forming an endless path including substantially circular portions; said path being adapted to receive and guide said pins for movement therein; means including the pins per se for moving the pins along said path; wiping, dipping and spinning stations at the circular portions of said path; and means associated with said wiping and spinning stations for rotating the pins about their axes as they travel through the circular portions of said wiping and spinning stations.

7. In a capsule making machine, a series of individual, discrete capsule part-forming pins; an endless path formed in part by stationary track members and including substantially circular portions at spaced points therealong; said pins being adapted to be moved continuously and progressively along said path; means including said pins for moving them along said path; a container of capsule forming material associated with one of said circular portions; means at such circular portion for lowering and raising the pins into and out of said capsule forming material; and means at certain other of said circular portions for rotating said pins axially as they travel through said portions.

8. In a capsule making machine, a series of physically unconnected independent, individual capsule part-forming pins; a container for fluid capsule making material; means for maintaining said material at a predetermined temperature; means for dipping said pins into the material; and means for spiralling the pins thorugh an inverted vertical position to distribute the coating material thereon.

9. In a capsule making machine, a series of physically unconnected, independently mounted, individual capsule part-forming pins; a container for fluid capsule making material; means for dipping said pins into said material; means for spiralling the pins through an inverted vertical position to distribute the coating material thereover; and means for rotating the pins axially for further distributing the coating material thereover.

10. In a capsule making machine, a series of physically unconnected, independent, individual capsule part-forming pins; means for heating said pins; a container for fluid capsule making material; means for maintaining said material at a predetermined temperature with respect to the temperature of said pins; means for dipping said pins into the material; means for spiralling the pins through an inverted vertical position to distribute the coating material thereover; and means for rotating said pins axially for further distributing said coating material thereover.

11. In a capsule making machine, a continuous series of individual, independently mounted capsule part-forming pins; stationary track means forming an endless path for said pins comprising an extensive, multiple tiered, sinuous portion and an interconnecting portion including stations having mechanisms for performing predetermined capsule making operations on the capsule part-forming pins; means including the pins per se for moving said pins continuously and progressively along said path; said mechanisms being adapted to perform said operations on said pins without interrupting the continuous, progressive movement of the pins along said path.

12. In a capsule making machine, a continuous series of independent, separate and disconnected capsule part-forming pins; track means defining a substantially endless path along which said pins are guidably movable; means including the pins per se for continuously and progressively moving said pins along said path; a plurality of operation performing mechanisms formed in continuity with and as an integral part of said path; said mechanisms being movable with the progressive advance of the pins into association therewith and operable during such advance to complete the particular operation to be performed.

13. A capsule machine comprising a plurality of individual, unconnected, capsule-body mold pins and a complementary plurality of opposed individual, unconnected, capsule-cap mold pins, opposed path-defining means for guiding the movement of said body and cap pins along a predetermined path, means for driving said pins along said path-defining means, said driving means including pin-wiping and dipping, and capsule - forming - material distributing, drying, and stripping mechanisms incorporated with said path-defining means and operable to synchronously and with uninterrupted continuous movement advance said pins along said path from said wiping mechanism through said intermediate mechanisms to the stripping mechanism and thence back to said wiping mechanism.

14. A capsule machine comprising a plurality of individual unconnected capsule body mold pins and a complementary plurality of opposed individual unconnected capsule cap mold pins, opposed path-defining means for guiding the movement of said body and cap pins, means for driving said pins along said path means, said driving means including pin wiping and dipping, and capsule forming material distributing, drying, and stripping mechanisms incorporated with said path-defining means and operable to synchronously and with uninterrupted continuous movement advance said pins along the path-defining means from said wiping mechanism through all of said intermediate mechanisms to the stripping mechanism and thence back to said wiping mechanism, and trimming, joining, and ejecting mechanisms associated as a loop branch of said path-defining means at the stripping mechanism for continuously and uninterruptedly receiving the stripped capsule caps and bodies and advancing same along said loop branch for trimming, joining and ejecting the finished capsules.

15. In a capsule making machine; a series of individual, discrete pins upon which capsule parts are formed; rotary carrier means conveying said pins continuously, seriatim through a predetermined path; means continuously feeding said pins to said carrier means; rotary magazine means for continuously carrying capsule part holders spaced from but in axial alignment with said pins for a portion of said path; and stripping means associated with said magazine means operable continuously as the aligned holders and pins advance along said path to remove capsule parts from said pins to said holders.

16. In a capsule making machine; a series of individual, discrete pins upon which the capsule parts are formed; a series of holders for receiving capsule parts; rotary magazine means adapted to support and continuously advance said holders in an endless, curved path; rotary carrier means adapted to continuously, seriatim, removably receive and advance said pins in a curved path spacedly paralleling a portion of said magazine path and in axial alignment with said holders; stripping means associated with said magazine means operable to remove capsule parts from said pins to said holders; and knife means associated with a portion of said magazine and engageable with portions of the capsule parts extending from the holders to trim said capsule parts.

17. In a capsule making machine; a series of individual, discrete pins upon which the capsule parts are formed; a series of holders for receiving capsule parts; rotary magazine means adapted to rotatably support and continuously advance said holders in an endless, curved path; rotary carrier means adapted to continuously, seriatim, removably receive and advance said pins in a curved path spacedly paralleling a portion of said magazine path and in axial alignment with said holders; stripping means associated with said magazine means operable to remove capsule parts from said pins to said holders; knife means associated with a portion of said magazine means and rotatable therewith into engagement with portions of the capsule parts extending from the holders; and traction means associated with a part of said magazine means adapted to engage and impart rotation to said holders preparatory to and while the knife means is in engagement with the extending portions of the capsule parts.

18. In a capsule making machine in which capsule parts are formed upon a series of individual, discrete pins; rotatable disk means adapted to carry said pins continuously and progressively along a reentrantly curved path; a plurality of cooperatively associated, rotatable drum members spaced laterally from but having their peripheries following generally the contour of said pin path; means for driving said members and disk means continuously in rotation; and capsule-part stripping, holding, positioning and trimming mechanisms arranged peripherally of said members and continuously operable as said pins advance along said path to strip the parts from the pins, place the parts in the holding mechanisms, position the parts therein for trimming, and trim the parts.

19. In a capsule making machine in which capsule bodies are formed on a series of discrete pins adapted to be moved continuously along a predetermined path and capsule caps are formed on a companion series of discrete pins likewise adapted to be moved continuously along a similar predetermined path; means for moving said pins along said paths; rotatable disk means incorporated in said paths and adapted to removably receive and carry said cap and body pins in axially aligned, oppositely projecting relation; a series of capsule cap and body holders; a plurality of rotary drum members for carrying said holders in axially aligned, opposed, spaced relation to said pins; means for driving said disk means and said drum means synchronously and continuously in rotation; and means on said drum means operable during said rotation to remove the cap and body parts from their respective pins and position said parts in their respective cap and body holders.

20. In a capsule making machine in which capsule caps and bodies are formed, respectively, on separate series of discrete pins arranged in axially aligned, oppositely projecting, relation and adapted to be moved synchronously and continuously along separate, parallel predetermined paths; means for moving said pins along said paths; a series of capsule cap and body holders; means for movably supporting said holders adjacent to their respective cap and body pins; means for moving said holders synchronously with said pins for a portion of said paths; and means associated and movable with said holder means operable to remove said caps and bodies from said pins to said cap and body holders while the pins and holders move together along said portions of said paths.

21. In a capsule making machine in which capsule caps and bodies are formed on separate paired series of discrete, axially aligned, oppositely projecting cap and body pins; means for progressively and continuously moving said pins along predetermined, spaced, parallel paths; said means including a plurality of pairs of rotating disks adapted and arranged to removably receive, progressively advance and transfer the pins in pairs from one disk to the next; separate series of paired capsule cap and body holders; a plurality of paired rotating drum members adapted and arranged to removably receive, progressively advance and transfer said holders from one drum member to the next, certain of said drum members being aligned with said pin-carrying disks so that said cap and body holders are brought progressively and continuously into spaced, axially aligned relation with the outwardly projecting ends of said cap and body pins and certain of said drum members being offset from said pin-carrying disks to transport the holders out of the path of said pins.

22. In a capsule making machine in which capsule caps and bodies are formed on separate, paired series of discrete, axially aligned, oppositely projecting cap and body pins; means for progressively and continuously moving said pins along predetermined, spaced, parallel paths; said means including a plurality of pairs of rotating disks adapted and arranged to removably receive, progressively advance and transfer the pins in pairs from one disk to the next; separate series of paired capsule cap and body holders; a plurality of paired rotating drum members adapted and arranged to removably receive, progressively advance and transfer said holders from one drum member to the next, certain of said drum members being aligned with said pin-carrying disks so that said cap and body holders are brought progressively and continuously into spaced, axially aligned relation with the outwardly projecting ends of said cap and body pins and certain of said drum members being offset from said pin-carrying disks to transport the holders out of the paths of said pins; means carried by certain of said disk-aligned drum members operable to strip the caps and bodies from the pins and to position the same in their respective cap and body holders while the holders and pins are continuously and progressively advanced along their paths; means carried by certain other of said disk-aligned drum members operable to trim the caps and bodies during their continuous and progressive movement to said offset drum members; and means on said offset drum members operable continuously and progressively to remove from their respective holders the caps and bodies and join same without interruption to the movement of said drum members.

23. In a capsule making machine, means for continuously and progressively forming separately, but in paired relation, capsule caps and capsule bodies; holders adapted continuously and progressively to receive and carry said caps and bodies in paired relation in spaced, predetermined paths; paired joining members adapted to receive the caps and bodies from their respective holders, said members being arranged to travel adjacent to said holders for at least a portion of said paths and to be moved away from said holders toward one another into juxtaposition; and means associated with said holders and members operable during their travel along said path to remove the caps and bodies from their respective holders to their respective joining members, to move said members into juxtaposition, to move the caps and bodies into a predetermined joined relation within said members and to remove the members from juxtaposition, thereby releasing the assembled capsules.

24. In a capsule making machine, means for continuously and progressively forming separately, but in paired relation, capsule caps and capsule bodies; holders adapted to continuously and progressively receive and carry said caps and bodies in paired relation in spaced, predetermined paths; paired joining members having cap and body receiving bores and arranged to travel adjacent to said holders for at least a portion of said paths and to be moved laterally away from said holders, toward one another, into joining position; means on said members effective to removably connect said members in said joining position and thereby insure a precision axial alignment of said bores; and means associated with said holders and said members operable during their travel along said path to remove the caps and bodies from their respective holders into the bores of their respective joining members, to move the members into bore-aligned joining position, to move the caps and bodies into a predetermined joined relation within the members and to remove the members from joining position, thereby releasing the assembled capsules.

25. In a capsule making machine; a series of discrete, unconnected pins upon which capsule bodies are formed; a second series of discrete, unconnected pins upon which capsule caps are formed; means including the pins per se for moving each series, in unison with the other, continuously and progressively along separate predetermined paths; means for applying films of liquid capsule forming material upon the pins; means for evenly distributing the film coatings about the pins; means for drying said coatings; means for removing the caps and bodies from said pins; means for trimming the caps and bodies to predetermined lengths; and means for inserting the bodies within the caps; all of said means being operative to effect their respective operations while said pins and said cap and body parts are continuously and progressively advanced along said paths.

26. In a capsule making machine; means for simultaneously, continuously and progressively moving through said machine complementary series of paired, discrete, unconnected capsule cap and capsule body forming pins; said machine including means for coating the pins with capsule material in fluid form; means for evenly distributing said material over and about the surfaces of said pins; means for drying the coatings; means for removing from said pins the bodies and the caps, trimming off excess material therefrom and inserting the bodies within the caps; all of said means being operable during and without interruption to the continuous and progressive movement of the pins through the machine.

27. In a capsule making machine, a series of individual, discrete capsule part-forming pins, means for guiding said pins through an endless path, a container for capsule forming material having a portion conforming to a part of said path, means for continuously advancing said pins along said path, means for dipping said pins into said container during the said continuous advance of said pins along said path, means for moving said container in the direction of the travel of said pins, and means associated with said dipping means and operable at the will of the operator to render said dipping means ineffective.

28. In a capsule making machine, a series of independent, individual, physically unconnected, capsule part-forming pins; means for cooling said pins; a container for fluid capsule making material; means associated with said container for maintaining said material at a predetermined temperature with respect to the temperature of said pins; means for dipping said pins into the material; means for spiralling the pins through an inverted vertical position to distribute the coating material thereover; and means for rotating said pins axially for further distributing said coating material thereover.

29. In a capsule making machine, a series of independent, individual, physically unconnected, capsule part-forming pins; means for controlling the temperature of said pins; a container for fluid capsule making material; means associated with said container for maintaining said material at a predetermined temperature with respect to the temperature of said pins; means for dipping said pins into the material; means for spiralling the pins through an inverted vertical position to distribute the coating material thereover; and means for rotating said pins axially for further distributing said coating material thereover.

30. In a capsule making machine comprising a frame having tiers of tracks fixed in spaced parallel relation thereon, a plurality of individual capsule-part forming members, each of said members comprising a pin having an angularly disposed base adapted to be guidably mounted for sliding movement in the spaces between the tracks with the base of one pin in contact with the base of the next adjoining pin, and driving means adjacent the ends of said tracks adapted to engage said capsule-part forming members and continuously and progressively move said members along the tracks and transfer said members from one tier to the next.

31. In a capsule making machine, a frame, tiers of tracks fixed in spaced parallel relation on said frame, guide means spacedly spanning alternate opposite ends of said tracks, a plurality of individual pins upon which the capsules are to be formed, each of said pins having a base adapted to be mounted for guided sliding movement along the tracks in the spaces therebetween with the base of one pin contacting the base of the next adjoining pin, driven rotatable notched members adjacent the opposite ends of the tracks to form with the spaces between the tracks and said guide means a continuous, endless, path, the notches of said members being adapted to receive and embrace the bases and thereby push the pins along the tracks in opposite directions in adjoining tiers and to transfer the pins from one tier to the next adjacent tier.

ALFRED W. KATH.

References Cited in the file of this patent

UNITED STATES PATENTS

| Number | Name | Date |
| --- | --- | --- |
| 968,791 | Olsson | Aug. 30, 1910 |
| 1,585,880 | Schnell | May 25, 1926 |
| 1,705,703 | Baker | Mar. 19, 1929 |
| 1,787,777 | Colton | Jan. 6, 1931 |
| 1,969,323 | Person | Aug. 7, 1934 |
| 2,041,788 | Sprunger | May 26, 1936 |
| 2,081,533 | Ford et al. | May 25, 1937 |
| 2,299,269 | Gammeter | Oct. 20, 1942 |
| 2,351,202 | Hahne | June 13, 1944 |
| 2,353,256 | Maywald, Jr. | July 11, 1944 |
| 2,392,049 | Kinnucan | Jan. 1, 1946 |
| 2,393,678 | Graham | Jan. 29, 1946 |
| 2,476,868 | Hrebek | July 19, 1949 |